United States Patent [19]

Gosney et al.

[11] Patent Number: 6,014,430
[45] Date of Patent: Jan. 11, 2000

[54] MESSAGE SYSTEM

[75] Inventors: Peter J. Gosney, East Brighton; Ron Gully, 210 Hope Street, Geelong, West Victoria 3218, both of Australia

[73] Assignees: Flexydial Pty Ltd.; Ron Gully, both of Victoria, Australia

[21] Appl. No.: 08/676,374

[22] PCT Filed: Jan. 10, 1995

[86] PCT No.: PCT/AU95/00007

§ 371 Date: Oct. 15, 1996

§ 102(e) Date: Oct. 15, 1996

[87] PCT Pub. No.: WO95/19679

PCT Pub. Date: Jul. 20, 1995

[30]     Foreign Application Priority Data

| Jan. 18, 1994 | [AU] | Australia | PM 3395 |
| Apr. 29, 1994 | [AU] | Australia | PM 5342 |
| Jun. 6, 1994 | [AU] | Australia | PM 6089 |
| Jul. 18, 1994 | [AU] | Australia | PM 6871 |
| Sep. 9, 1994 | [AU] | Australia | PM 8072 |

[51] Int. Cl.[7] ................................................ H04M 11/00
[52] U.S. Cl. ..................................... 379/93.12; 379/93.17
[58] Field of Search ............................. 379/93.12, 91.01, 379/93.01, 93.17, 93.23, 38, 39, 40, 41, 45, 46, 51

[56]               References Cited

U.S. PATENT DOCUMENTS

| 4,482,785 | 11/1984 | Finnegan et al. | 379/41 |
| 4,492,820 | 1/1985 | Kennard et al. | 379/51 |
| 4,897,865 | 1/1990 | Canuel | 379/93.17 |
| 4,922,514 | 5/1990 | Bergeron et al. | 379/40 |
| 5,128,979 | 7/1992 | Reich et al. | 379/38 |
| 5,343,509 | 8/1994 | Dounies | 379/40 |
| 5,351,296 | 9/1994 | Sullivan | 379/93.12 |
| 5,398,277 | 3/1995 | Martin, Jr. et al. | 379/39 |
| 5,438,607 | 8/1995 | Przygoda, Jr. et al. | 379/38 |

FOREIGN PATENT DOCUMENTS

| 7591691 | 10/1992 | Australia . |
| 372877 | 6/1990 | European Pat. Off. . |

OTHER PUBLICATIONS

Patent Abstracts of Japan, E–1645, p. 19, JP,A, 6–21158 (Brother Ind Ltd) Sep. 16, 1994.

Derwent Abstract Accession No. 91–359039/49, Class W01,JP,A,3241953 (NEC Corp) Oct. 29, 1991.

Derwent Abstract Accession No. 88–032720/05 Class WO1, JP,A,62292048 (Toshiba KK) Dec. 18, 1987.

*Primary Examiner*—Stella Woo
*Attorney, Agent, or Firm*—Biebel & French

[57]              ABSTRACT

A device for dispatch of messages is provided which has particular application to dispatch of messages for ordering taxis. The device has a memory for storing information used to define the message, a communicating device for making a call to a taxi company, a message dispatch initiating button for permitting a user to initiate the call, and a message confirmation output to provide a confirmation of receipt of call. The device is controlled by a processor. In use, a person requiring to dispatch a message activates the message dispatch initiating button, and the device will automatically activate the communicating device. The communicating device will then call a recipient, relay the information from the memory to the recipient, process an acknowledgement of receipt of the message to activate the message confirmation output, and terminate the call with the recipient, all without further intervention by the person.

27 Claims, 13 Drawing Sheets

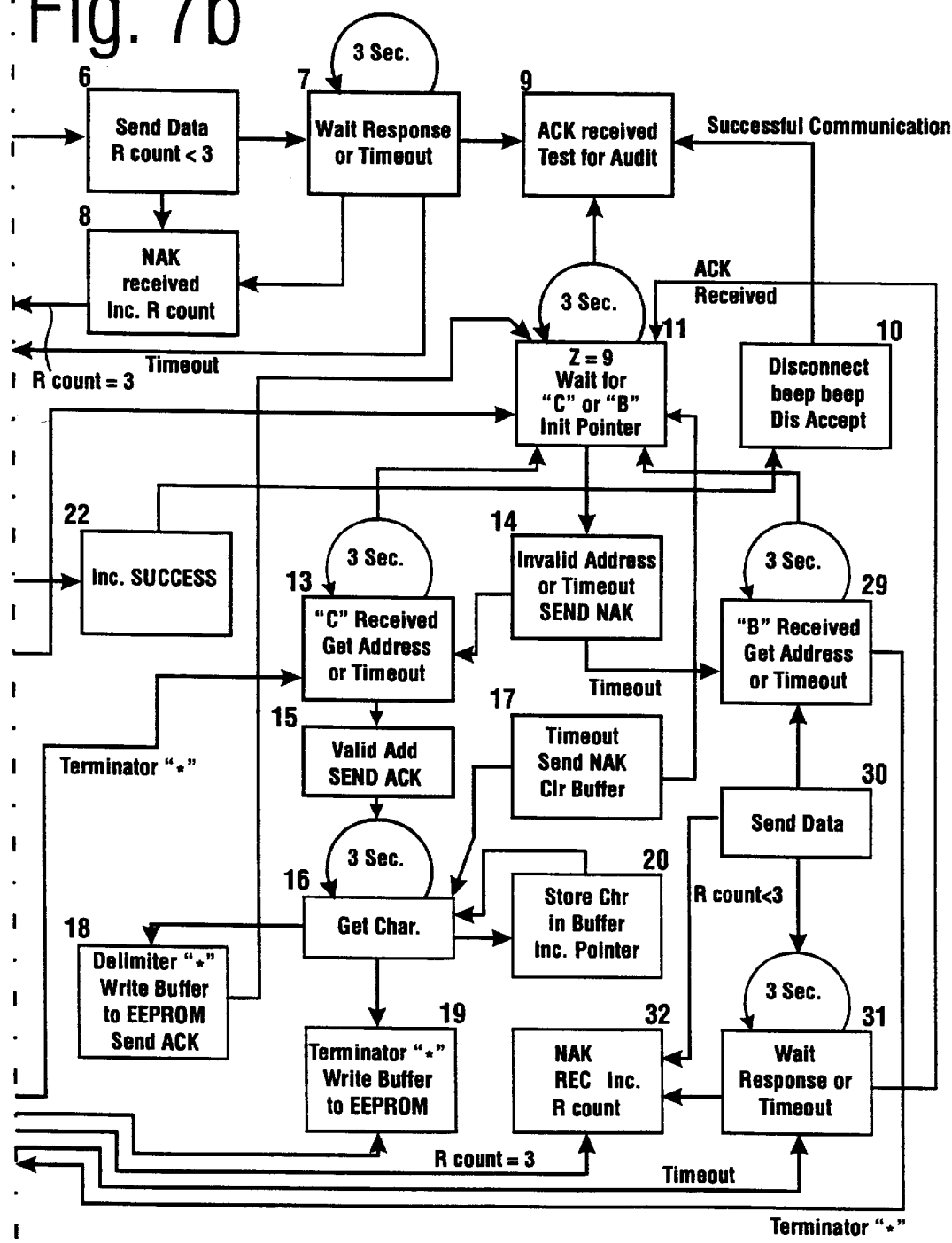

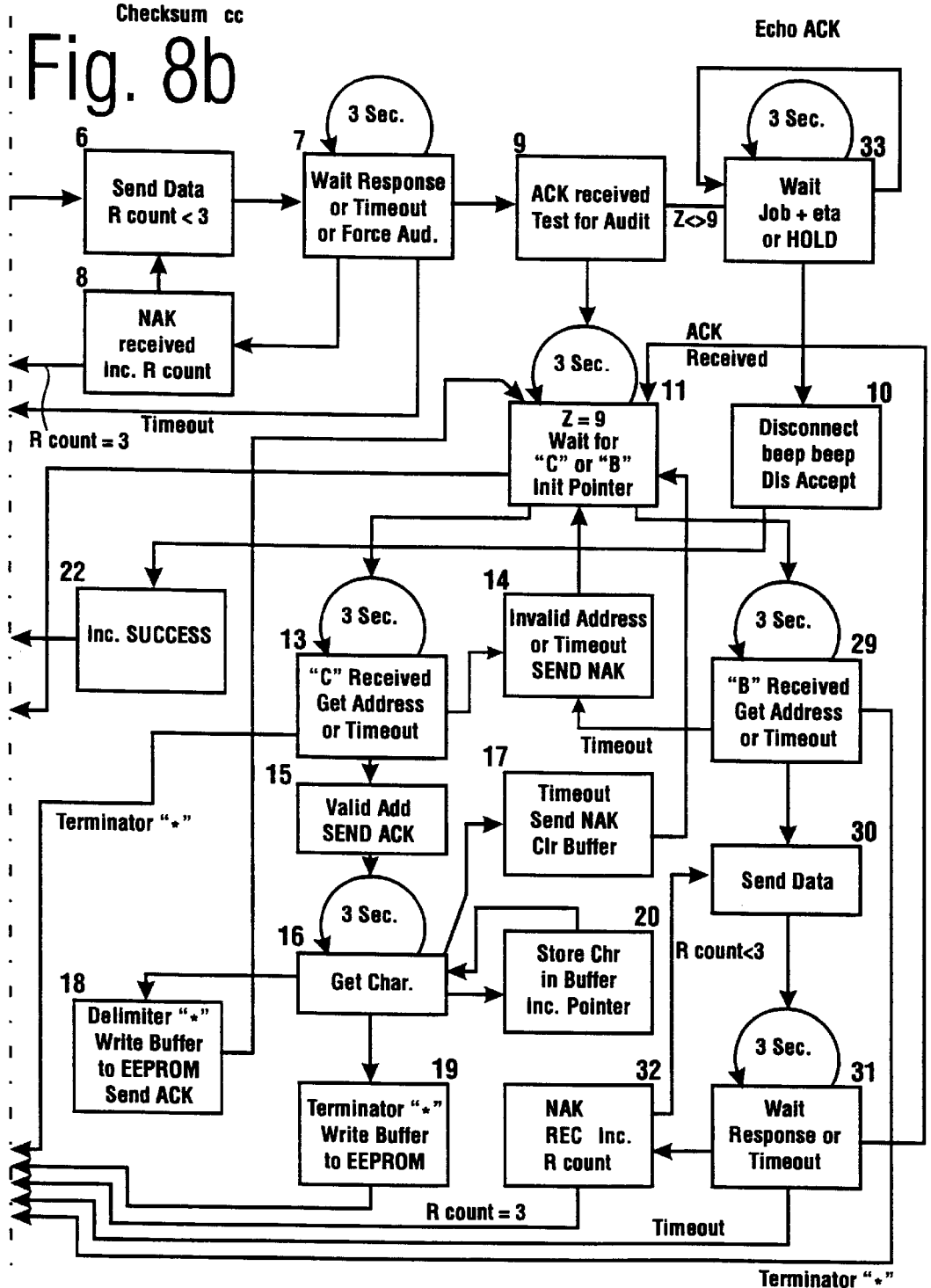

MESSAGE SYSTEM

This application was described in the specification filed as PCT application number PCT/AU95/00007 on Jan. 10, 1995.

FIELD OF THE INVENTION

The present invention relates to a device and a method for dispatch of messages. In particular, the present invention relates to an electronic device and a method for dispatch of messages for ordering vehicles including for-hire-transportation such as taxis but can have wider application to message dispatch generally such as for paging, for elderly persons assistance or alert ordering or burglar surveillance ordering.

DESCRIPTION OF PRIOR ART

When for-hire-transportation such as a taxi is required for providing transport for a person from one location to another, it is usual for a taxi to be ordered by telephoning a taxi company and requesting a taxi from a telephone operator at the taxi company. That operator then records details of the order, including the location where the taxi is required, and radios a taxi to fill the order. Instead of radioing the taxi, the telephone operator may, alternatively, enter details of the order into a computer and the order can be electronically relayed to a taxi for speedier and more reliable results.

The above system suffers from a number of problems, especially during busy periods when it may be difficult to reach the taxi company by telephone. Furthermore, errors arise in the oral communication of the order which results in the taxi not being ordered or going to the wrong location.

In restaurants or bars when a taxi is required the bar attendant or waiter is usually requested to order a taxi when the bar or waiter services are otherwise required. This is generally inconvenient and time consuming as the bar attendant or waiter needs to be at a telephone for an extended period to make the necessary dialling and ordering, await the taxi company answer to the call, relay the order message, and subsequently confirm to the customer that a taxi has been ordered

OBJECT AND STATEMENT OF THE INVENTION

The present invention attempts to overcome one or more of the above problems.

According to one aspect of the present invention there may be provided a device for dispatch of messages comprising:

memory means for storing information which can be used to define the message a communicating device for making a call for the dispatch of the message to an intended recipient a message confirmation means which will confirm that the message has been received by said recipient a message dispatch initiating means by which a person requiring to dispatch the message can initiate procedures to dispatch that message and a processing means interconnecting the above whereby, in use, a person requiring to dispatch a message activates said message dispatch initiating means, and said device will automatically activate said communicating device, said communicating device will then call said recipient, relay said information from said memory means to said recipient, and then process an acknowledgment of receipt of the message to activate said message confirmation means and then subsequently terminate the call with said recipient, all without further intervention by said person.

It is particularly preferred that the device be for placing orders, as the message, and that the message dispatch initiating means be an order request initiating means.

It is preferred that the order request initiating means be a push button. It is particularly preferred that said device have an order request initiating means for one particular type of order, and a second or subsequent order request initiating means for a different or subsequent type of order.

It is also particularly preferred that the order request initiating means include an order request initiating means which cancels a previous order.

It is further particularly preferred that said communication means can call a provider which will transact the order via a second or subsequent communication source. In this way, if an attempt to communicate by the first source cannot be completed due to the fact that it in already engaged, for example, then it can attempt communication by the second or subsequent communication source all automatically.

It is particularly preferred that the system be tailored for ordering taxis with a taxi company and operate on a public service telephone network. In this embodiment the communicating device can be a telephone dialling device.

It is particularly preferred that when operating on a public service telephone network, the device may be connected in parallel with another telephone device without interference to the operation of that device.

According to a further aspect of the present invention there may be provided a system comprising the device previously defined and a device for installation at the recipient of the message so an to detect a call and message dispatch by said device and provide an appropriate confirmation signal which can activate the message confirmation means once the message has been received.

Preferably, the device at the recipient which will receive the message can conveniently comprise a computer device.

It is particularly preferred that the device at the recipient which will receive the message include a data storage means for storing user data for a plurality of users so that when the information is dispatched the data storage means can be accessed to recognise the information and determine the message from the information communicated or determine the particular address from which the message is dispatched or to which the order is to be transacted to. In this way, a code can be provided representative of the message or address and the code can be matched in the data storage means to extract the actual message or address.

In accordance with a further broad aspect of the present invention there may be provided a method of dispatch of a message comprising the steps of (a) storing information which can be used to define the message, (b) activating a message dispatch request initiating mans to, in turn, subsequently automatically activate a communication device to communicate with the intended recipient, communicating said information, subsequently receiving an acknowledgment of receipt of the message and activating a message confirmation means, and then subsequently terminating the communication with said recipient.

The processing means of the preferred embodiment of the invention also includes a reprogramming facility for altering information contained in the device from a remote location.

Preferably the reprogramming facility is provided by a telephone line linkage from a remote processing station which communicates with the processing means to alter data in the memory or data retained in the communication means.

Most preferably the programming facility is initiated when necessary following a message dispatched by the dispatch device to the remote processing station whereupon the remote processing station, upon receipt of the message, outputs a signal to the dispatch device indicating reprogramming is to take place and outputs new data to alter the data in the memory or communication means. The remote processing station may be a central processing station or the device for installation at the recipient of the message.

Preferably the device also includes a connection to an AC power socket to supply power.

Preferably the device includes a status display means to provide an indication of the status of the last dispatch of a message.

The status display means preferably comprises a display for permanently displaying the status of the last message until next use of the device and circuit means for causing one or more lights to illuminate to indicate the status of the last message.

Preferably the device includes audit means for causing the processing means to output data relating to the number of successful message dispatches, as well as the number of unsuccessful attempts to dispatch messages, to a central station.

Preferably the central station for audit messages may not always be the recipient of said messages.

Preferably the audit means is triggered in response to a predetermined number of successful message dispatches or unsuccessful attempts to dispatch messages or a predetermined time period to cause data relating to the number of successful dispatches to be provided to the central station for billing purposes.

Preferably, therefore, the audit means comprises at least one counter or a clock.

Preferably, the audit means may also be triggered by a signal from a recipient of a message.

Preferably, the audit means may also be triggered by activation of a particular sequence of message dispatch request initiating means.

Preferably the processing means also causes a job identification code to be dispatched with the message so the particular job request by the device can be identified.

Preferably the job identification code is provided by said counter so that the existing count maintained by the counter plus one is outputted with the message to provide a job identification code.

Preferably the device also includes a display for displaying the identification code outputted with the message so that the user of the device also obtains an indication of the job number which has been dispatched with the message.

Preferably the device also includes means of connecting a remote order request initiating means, sited away from the device.

Preferably the remote order request initiating means may be connected by means of wires.

Preferably the remote order request initiating means may be connected by means of infra-red or wireless transmission.

Preferably the device includes additional input means for providing additional information to be communicated to the device for installation at the recipient of th message for conveying destination data and/or customer data to be provided to the recipient of the message.

BRIEF DESCRIPTION OF THE DRAWINGS

Examples of the preferred embodiments of the present invention will now be discussed with reference to the accompanying drawings, in which:

FIG. 6 is a display diagram showing possible displays in the example of FIG. 5; and FIGS. 7a and 7b; 8a and 8b; and 9a and 9b show respective State Diagrams of the devices of FIGS. 3, 4 and 5 using the circuit of FIG. 6.

DETAILED DESCRIPTION OF PREFERRED EMBODIMENTS

Figure 1:
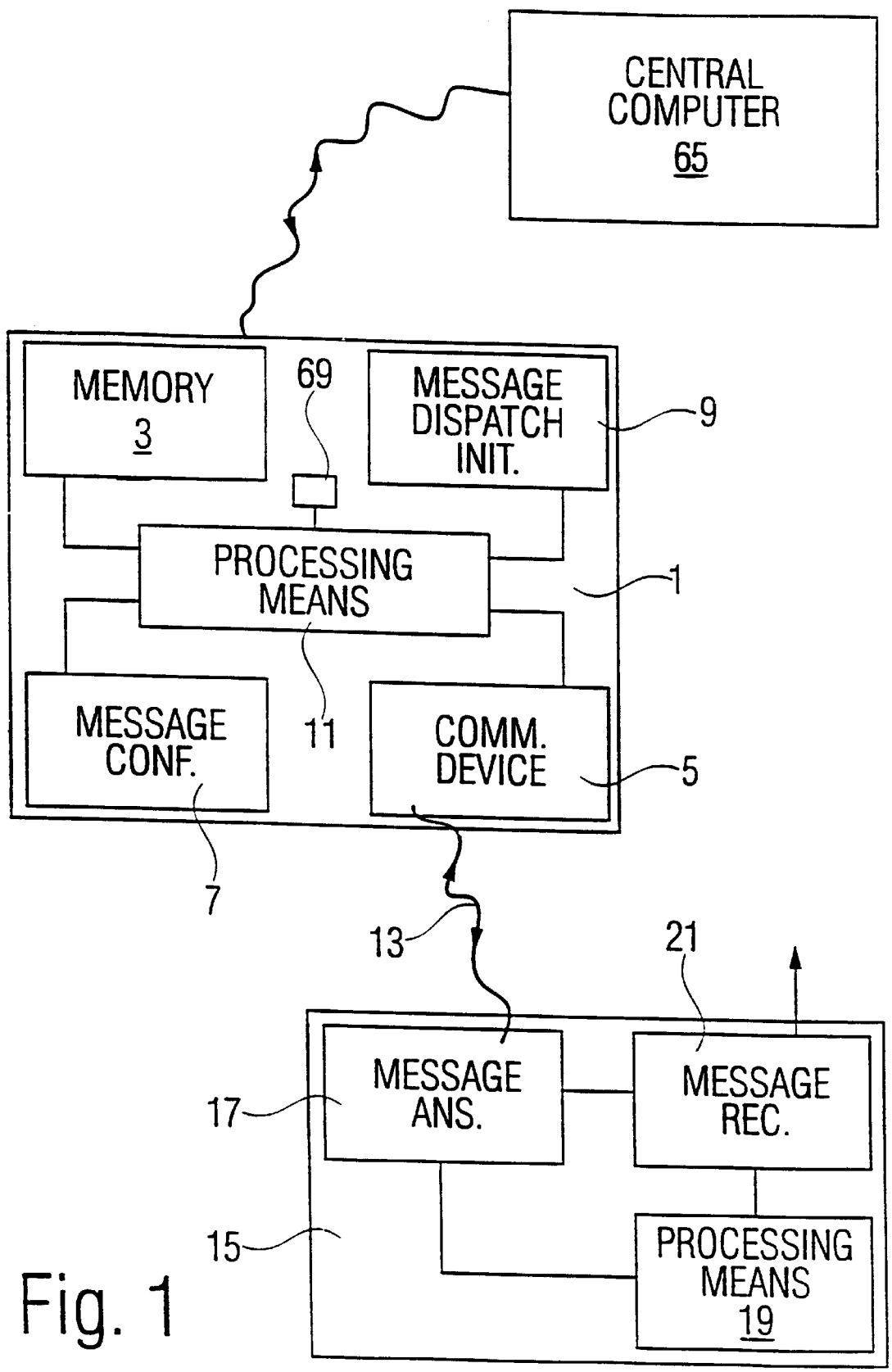
FIG. 1 illustrates a device for dispatch of messages to an intended recipient.

Referring now to FIG. 1 there is shown a device 1 for dispatch of messages to an intended recipient. The device 1 can connect with the recipient by any convenient communication means, such as by a telephone network, by a radio network, or by any other means by which information can be relayed from one location to a further location. The recipient of the message is provided with a device 15 which can receive the message transmitted from device 1. The communication has been shown generally by communication link 13. The device 1 has memory 3 for storing message information. It also includes a message dispatch initiating means 9, a communication device 5, a message confirmation means 7, and a processing means 11 interconnecting each of the memory 3, message dispatch initiating means 9, communication device 5 and message confirmation 7. The processing means is programmed so that when the message dispatch initiating means 9 is operated, it will activate the communication device 5 automatically and the communication device 5 will make a connection with device 15. Device 15 has a message answering means 17, a message recording means 21, and processing means 19 interconnecting the message answering means 17 and the message recording means 21.

Accordingly, after the combination device 5 in device 1 establishes communication with device 15, the processing means 11 then extracts the message information from memory 3 and transmits it to the message answering device 17 which, in turn, passes it to the message recording means 21. This is under control of the processing means 19. When the message recording means 21 receives the message from memory 3, processing means 19 in turn causes a signal to be provided which is relayed back from the message answering means 17 to the communication device 5 to, in turn, provide a message confirmation signal to activate message confirmation means 7. In this way, a message stored in memory 3 can be transmitted from device 1 to device 15 and a message confirmation signal transmitted back to device 1 to activate the message confirmation means 7. All this is operated automatically upon activation of the message dispatch initiating means 9. Thus, in the case where a message is to be relayed from one location to another, such as a person calling home and requesting that, for example, dinner preparation is to be commented, the message for that can be stored in the memory 3. By a single operation of the message dispatch initiating means 9 such as by operating a push button, the system can automatically collect with device 15 which can be at the home of the person where the message is to be relayed—the recipient of the message. The whole transaction is conducted automatically and a message confirmation signal is provided at the message confirmation means 7. The message can be a coded signal which is transmitted and this can be recognized at device 15 to extract the exact message particulars. A suitable data storage means can be used at device 15 to store the message and corresponding code signal data. The system has application to ordering generally and may be utilised in a system for requesting for-hire-transportation such as a taxi ordering system. In this case, memory 3 may have stored in it information concerning a person requesting a taxi. In this case, therefore, the message to be relayed is the message that a taxi is required. This, in turn, is inherent in the operation of the system and the memory 3 contains information concerning the address to which the taxi is to be sent. This may be in a coded signal, which can be recognized in device 15 to extract the exact address particulars. A suitable data storage means may be provided at device 15 to store the address and code signal information. Thus, the device 15 can be at a taxi company and the device 1 can be at the premises of a person who frequently calls taxis. By a single operation of the message dispatch initiating means 9 a taxi can be ordered and information transmitted as to the location as to where the taxi should arrive.

Figure 2:
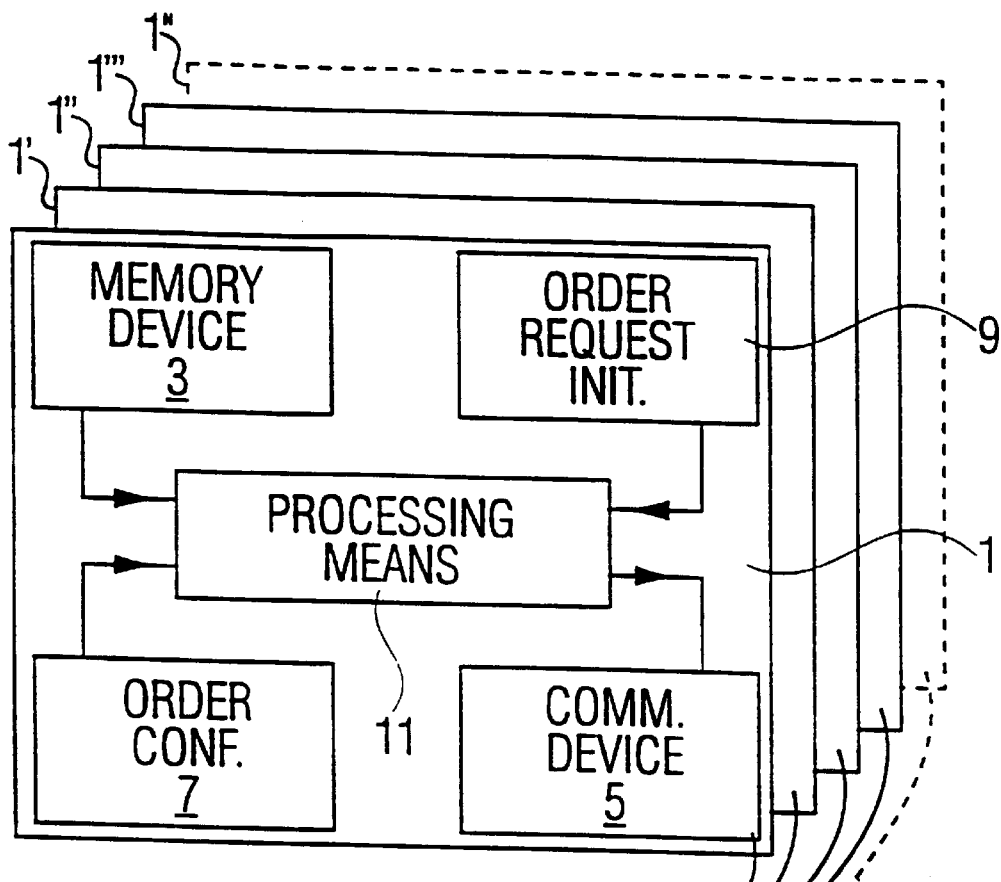
FIG. 2 illustrates a device at the promises of the provider which will transact the order, according to one example of a preferred embodiment of the present invention.
Figure 2:
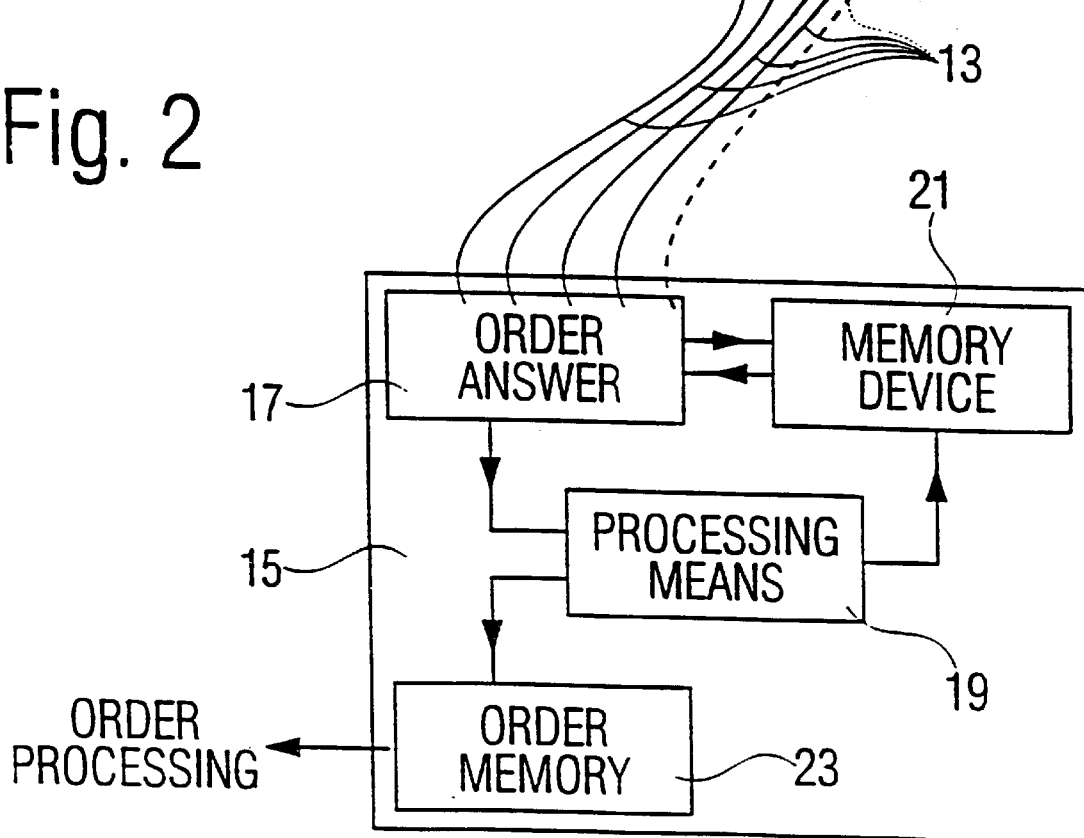

Referring now to FIG. 2 there is provided a device 1 for ordering. The device 1 has components similar to that in FIG. 1 and where this occurs corresponding numerals have been used. A number of other devices 1', 1", 1''', 1 are shown. Each of devices 1', 1", 1''', $1^N$ will be substantially identical to that identified by numeral 1. The device 1 includes a memory device 3 for storing information which can be used to determine the requesting address to which the provider will transact the order will respond to. This can conveniently comprise an $E^2$PROM device. It may comprise other memory means as for example, a series of DIP switches which can be toggled to provide different code combinations representing a particular address to which the provider will transact the order to. Device 1 also includes a communicating device 5 for making a call for the order to the provider. The device 1 also has an order confirmation means 7 which will confirm that the order has been received by the provider. The device 1 also includes an order request initiating means 9 by which a person requesting an order can initiate procedures to order. The device 1 also includes a processing means 11 which can comprise a central processing unit. The processing mans 11 is interconnected with the memory device 3, the communication device 4, the order confirmation means 7 and the order request initiating means 9 so that, in use, when a person requires to place an order he merely has to activate the order request initiating means 9 and the device will automatically activate the communication device 5 and the communicating device 5 will then call the provider as shown by the communication lines 13.

A device 15 is provided at the premises of the provider which will transact the order. The communication lines 13 may comprise radio communication means or direct wired connection or telephone lines or other communication means by which information can be relayed from one location to a further location.

When the provider receives a call from the communication device 5, device 15 it answers that call with an order answering means 17. During the call the processing means 11 in the device 1 activates memory device 3 to extract information which can be used to determine the address of where the service is to be provided. The processing means 11 then causes that information to be transmitted to device 15. The device 15 includes a processing means 19 such as a central processor which then activate a memory device 21 which may conveniently comprise a look-up table which stores information of each device 1', 1", 1''', $1^N$ and has a corresponding address for each of those devices. Thus, the address of the device 1 for which an order is being placed can be determined. That address can then be transferred to an order memory 23 for subsequent order processing. The processing means 19 can then provide a signal which can be communicated back to device 1 to signal that the order has been received by the provider. This signal is then passed to the order confirmation means 7 so that the person at device 1 can determine that the order has been received. The order confirmation means may comprise a visual or audible means or it may be both a visual and audible means. Typically the order request initiating means 9 comprises a push button. Thus, the person requiring to make an order merely has to operate the order request initiating means 9 and the system then automatically operates to communicate with device 15 and place the order. The device 15 can then provide a confirmation of order signal which can be provided to the order confirmation means 7. On completion device 1 will terminate connection with device 15. This is under control of the processing means 11.

The communicating device 5 may be able to communicate with device 15 by a number of different communication sources. For example, if a first channel is busy by one of the other devices 1', 1", 1''', $1^N$, then it can automatically attempt communication by a second or even possibly further communication sources. In this way, the order can be given without intervention by the person requiring to make the order after the order request initiating means 9 has been activated. The automatic nature can be under control of the processing means 11.

The order request initiating means 9 may include a series of different order request initiating means 9 wherein each is provided so that a different type of order can be made. Thus, by pressing a first order request initiating means 9 one particular order can be made. By pressing the second a different type of order can be made, etc. Making the different orders is initiated solely by a single operation of the order request initiating means 9 and requires no further intervention by the person requiring to make the order.

The order request initiating means 9 may also include a further order request initiating means to cancel a previous order. Accordingly, by a single operation of that order request initiating means 9 the previous order can be cancelled. This order request initiating means 9 may be linked with the other of the order request initiating means 9 so that if an order is to be cancelled two buttons may be pressed concurrently or one after the other such that the order request cancelling button is pressed and then the particular order request initiating means 9 which is to be cancelled pressed so that the device 15 will be able to identify which of the multiple orders which may have been placed from device 1 are required to be cancelled. Appropriate memory processing in device 15 can be used to identify that previous order and make the necessary cancellation.

It should be appreciated that the ordering system will have particular advantage for ordering taxis or couriers. In the case of ordering taxis, a busy bar attendant or waiter does not need to be at a telephone for an extended period to make the necessary dialling and ordering which was done with the normal public service telephone network taxi order. The bar attendant or waiter merely has to operate the order request initiating means 9 and the taxi order can be automatically placed and confirmed in the case of elderly persons' assistance or alert ordering, it can be appreciated that operation of the order request initiating mans 9 by such persons can call the ambulance station, doctor station, or other assistants station and the person will receive an order confirmation and thus know that help is on the way. In the case of a burglar surveillance ordering system, the order request initiating mans 9 may be shown as a panic button and a security company may be called. The order confirmation means 7 will be activated when the order has been placed thereby signalling to the person making the order that the order has been received and help is on the way. In the case where a panic button is used, it may be additional to a normal order request initiating means 9 and the order confirmation means for the panic situation may be different from the order confirmation means for normal order requests.

Figure 3:
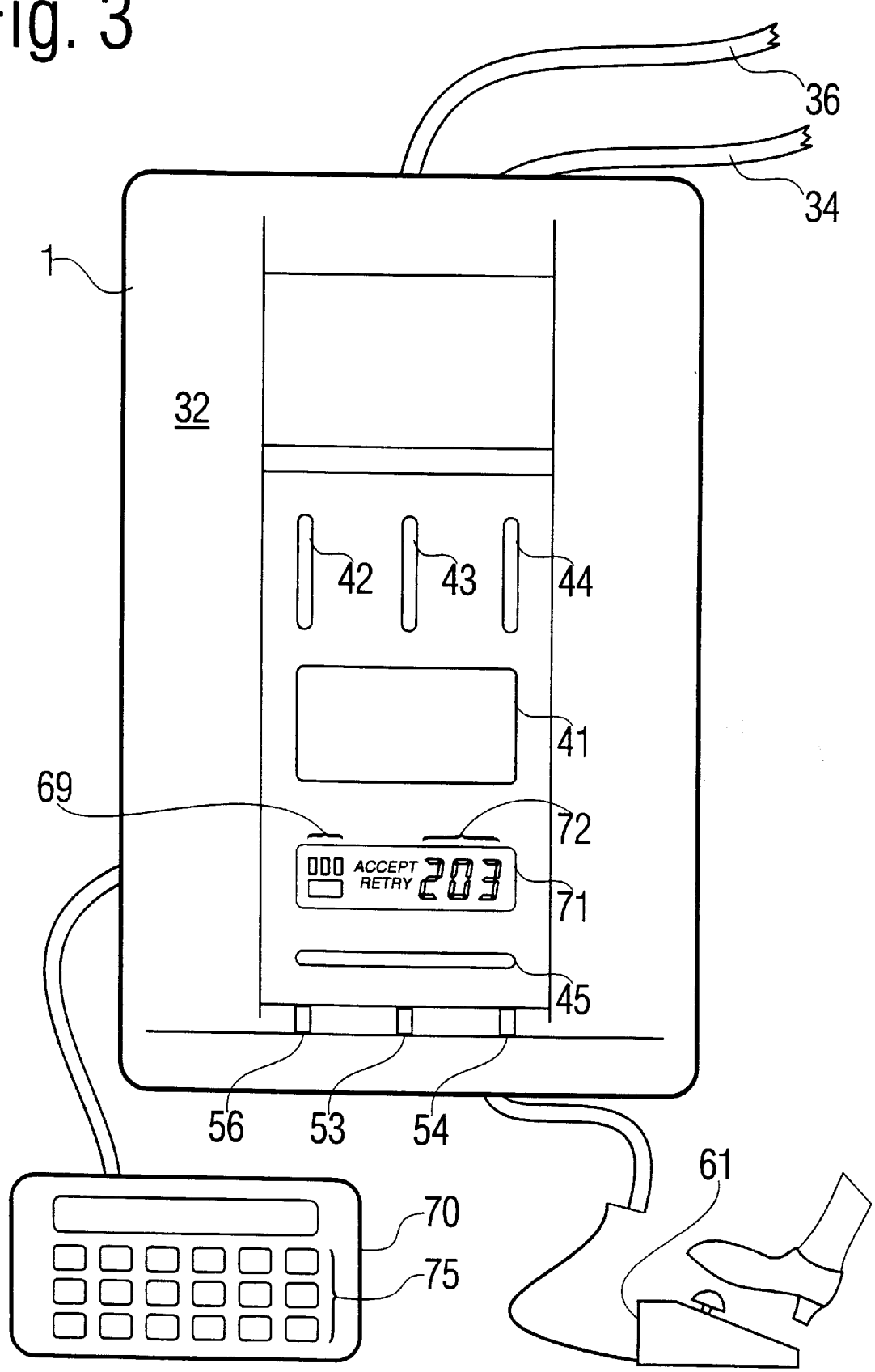
FIG. 3 illustrates a taxi ordering device according to another example of a preferred embodiment of the present invention.

Referring now to FIG. 3 there is shown an ordering device of the system where there is provided a central computer device (not shown) at a taxi company which coordinates the operation of a group of taxis. This equates to device 15 shown in FIGS. 1 and 2. On the computer device a database is kept of customers of the taxi company. This equates to memory device 21. The database is preferably provided with a record on each customer which has been provided with a taxi ordering device, including the customer's name, address, unique identification code and any other relevant details of the customer. The computer device preferably comprises an interface card built into a computer for connecting to a public service Telephone Network telephone line.

Customers are preferably provided with a device 1, as shown in FIG. 2 and as particularly shown in FIG. 3, for ordering a taxi. The device 1 is a small unit in a case 32 which can be connected to a telephone socket via telephone cable 34 and is connected to a power point via electrical cord 36. The device 1 may be connected directly to a phone socket via cable 34 or it may be connected in parallel to a normal phone on a standard telephone double adaptor connector.

The device 1 is controlled by a control unit (not shown) preferably comprising a microcomputer which is controlled by a program stored in a memory device.

A power supply (not shown) may be provided outside the case 32 which is connected to the power supply via power cord 36. The power supply can be used to step down the voltage from an AC power socket to the normal DC operating voltages required for control unit.

The face of the device 1 is provided with four buttons 41, 42, 43, 44 and 45. Each button corresponds to a particular order required from the taxi company. For example, button 45 may correspond to an order for one taxi, button 42 may correspond to an order for two taxis, button 43 corresponds to an order for a maxi-cab, and button 44 corresponds to an order for a limousine. A cancel button 45 is provided which cancels the last order placed it is possible to add further buttons corresponding to other services provided by the taxi company.

The preferred device 1 is provided with an order confirmation means in the form of a piezo electronic tone generator inside case 32.

In use, a customer which has been provided with a device 1, can order a taxi by simply pressing one of the buttons 41, 42, 43, 44 to select the type of taxi required. The control unit then reads the pressed key and stores details in memory. The control unit then turns on a call-in-progress LED 53 to indicate that a call is in progress. If the line is in use or the device 1 is not connected to a telephone line, the control unit outputs a "beep" signal to indicate an error via the piezo tone generator and displays a flashing red "RETRY" LED 54 to indicate lack of success. In a preferred embodiment the control unit may be programmed to retry the telephone line at regular intervals until the telephone line becomes available. If successive retries do not work, then the call is aborted and an error condition is indicated by for example a particular sound from piezo tone generator.

If the telephone line is available, the control unit seizes the line, waits for 2 seconds (as required by Austel TS 002 1992, 5.8.1.2d) outputs a "hold loop" signal to the telephone line and removes the "line seizure" signal (as required by Austel TS 002 1992, 5.8.1.2e).

The control unit then tests whether the telephone line is ready for a call or may keep retrying to get a line if a line in not immediately available. Once a line signal is detected, the control unit dials a telephone number which will allow it to connect to the computer device of the taxi company. The number may be stored in the memory of the control unit. It is possible to store more than one number and the control unit may then try alternative numbers—ie an alternative communication source—if it is unable to achieve a connection with the computer device through a first of the numbers. The dialling procedures are according to the rules laid down by Austel TS002 1992, 5.8.1.2h for dicadic dialling or according to Austel TS002 1992, 5.8.1.2j for tone dialling.

If after a number of retries it is still not possible to get a connection, then the control unit may try an alternative number stored within the memory of the control unit. If none of the numbers are able to make a connection, then the control unit indicates an error condition by different flashing of LED 54 and aborts the call.

In a variation the system may have say three alternative telephone numbers to make a call to the taxi company. Theme may be randomly or successively chosen on a rotary basis for subsequent calls so that one number is not continuously used and perhaps be substantially continuously engaged in the system when there are a large number of devices in use.

If a successful connection is made, the control unit waits for an identification tone from the computer device at the taxi company. If the tone is not made within a predetermined time limit then the control device drops the line and starts the connection process again.

Once the control unit has received the identification tone from the central computer device of the taxi company, the control unit sends an identification code which identifies the customer and the service required to the computer device. This identification code is a unique code for each button 41, 42, 43, 44 and 45 which is stored within the memory of the device 1. The central computer device receives the identification code and it is then able to compare the identification code with those stored in the computer to extract from the database the name and address and any particular requirements of the customer requesting a service. Each code may be a standard code representing a standard service provided by the taxi company, or alternatively it may be codes unique to each customer which can be looked up in a database to correspond to specific requirements of the customer.

The control unit then waits for a response from the central computer device. If an electronic acknowledgment signal is sent from the central computer device, the signal is detected and an acknowledgment "beep" tone is produced by the piezo tone generator.

The control unit then flashes LED 56 to indicate that the order has been acknowledged, releases the telephone line 36 and returns to a rest state thereby terminating the call.

A previous order may be cancelled by pressing the cancel button 45 which will again dial up the central computer and indicate to the central computer to ignore the previous order.

Should there be a hold-up or other unusual circumstance arise at the location where the device 1 is located, a foot actuated switch means 61 or a similar suitably concealed switch means for manual activation by a hand may be provided to automatically call the taxi company or another organization and to provide a signal indicating an unusual set of circumstances which require special attention. This may cause the taxi company or other organization which receives the request to call for police or to treat the request order as an urgent priority matter. Operation of the foot switch 61, or other similar switch which can be concealed, disables operation of the various LEDs and tone generator 48 for that particular call. In that way burglars, for example, are less likely to perceive that an emergency alarm condition has been transmitted from the device 1. In this way, the acknowledgment signals are disabled for that particular call.

Operation of foot switch 61 or other similar switch may invoke a program where police, for example, are dialed automatically by the device 1 rather than the taxi company or other organization which is normally dialled when using device 1.

In an alternative embodiment of the present invention the control unit stores a service number which the device 1 dials if service of the device is required or if it is persistently unable to got through to the taxi company. It may also download details of use or service difficulties to the service depot to assist the taxi company in maintaining the devices at customer locations.

The preferred embodiment of the invention also provides for reprogramming of the device 1 over the telephone lines from a central location such as a central computer station 65 or from the device 15. For example, should the facility which is to be called, such as the taxi company or the like, changes its telephone number the central computer 65 can communicate with all of the devices 1 located at various locations by means of the telephone network and cause the communication device to be re-programmed with the new telephone number so that the new telephone number is dialled by the communication device 5 the next time the device 1 is used.

The re-programming facility is initiated when the device 1 dispatches a message to the computer station 65 or the device 15. If it is necessary to change data in the device 1, upon receipt of a message from the device 1, the computer station 65 or device 15 outputs a flag signal indicating that re-programming is required and causes the processing means 11 to be alerted that new data is to be provided to the device 1. The new data is provided from the central computer 65 or the device 15 to alter the data in the memory 3 or the communication device 5. Thus, the device 1 can only be re-programmed upon making a call to the central computer 65 or the device 15 and receiving the flag indicating re-programming is required. Most preferably the reprogramming facility cannot be initiated by a call direct from the central computer 65 or the device 15 but only upon the device 1 making a call to the central computer 65 or device 15 and receiving the appropriate flag output. This prevents unauthorized re-programming of the devices 1 by direct communication with the devices 1 from unauthorized sources.

The preferred embodiment of the invention also includes a status function so that the status of the last attempt to dispatch a message can be determined. That is, whether the last message was successfully dispatched or whether it was not successfully dispatched.

The status function preferably includes an LCD display 71 which is coupled with the processing means so that upon a successful dispatch of a message an indication is displayed by the LCD display 71 such as "accept", or if the message was not successfully dispatched an indication such as "retry" can be displayed by the LCD display 71.

Preferably the relevant display is continuously displayed until the next attempt to use the device whereupon the display is cancelled and the status of the next attempt is then displayed. The LCD display may also display which button was depressed by a bar area which has individual bars corresponding to each of the buttons 41, 42, 43 and 44. An appropriate corresponding bar is therefore displayed filled to indicate the last button pressed.

Most preferably the status function also includes a circuit for causing an appropriate one of the LEDs 54 or 56 to light to indicate that a call has not been successful or has been successful respectively.

In the preferred embodiment of the invention the processing means 11 may also include an audit function to provide an audit signal after a predetermined condition prevails such as after a predetermined time period or after a predetermined number of calls have been made by the device 1. For example, the audit function may be triggered by a counter 69 (see FIG. 1) for counting the number of calls made by the device 1 or unsuccessful attempts to call and after a predetermined number of calls or attempts has been made (for example 100 calls or 100 attempts) can reset the counter 1 and provide the audit information to the central computer 65 indicating that 100 successful calls or 100 unsuccessful attempts have been made. That audit information can be used for billing purposes to either the user of the device 1 or the provider of the service called by the device 1. It may also be used to detect problems with the receiving of calls at the base of the provider. The central computer may also provide for a reprogramming of the processing means to alter the number of calls made or unsuccessfully attempted before the audit function is initiated or changing the time period before the audit function is initiated. For example, if the device is in heavy demand and is continually used the number of calls can be increased to 200 or more before the audit function is initiated. If the device is used only rarely the processing means 11 can be reprogrammed to initiate the audit function after for example 10 calls or 20 calls or after a much shorter time period.

An audit call may also be initiated by providing a unique audit tone emanating from the service provider during an incoming order request. This will, in turn, cause the device to be placed into a mode, so that after completion of the order and termination of the call, it will automatically make a dedicated audit call. This can be to a dedicated phone number such as at an audit depot where audit data is collected so that a charge can be made to the service provider, such as a taxi company, having regard to the number of calls received. In this way the service provider can initiate billing from the audit depot say at the beginning of each month, or any other convenient period. This will occur by the service provider activating either manually or automatically, say in a computer, for the generation of the unique audit tone at the required time period, so that all calls from all devices 1 will occur with the unique audit tone being received by the calling device 1. It is assumed that all devices 1 will call the service provider such as a taxi company more than once each day. Accordingly, audits will be made of each device 1 on a given day, as requested by the service provider. The unique audit tone can then be disabled until the next time billing is required.

In the preferred embodiment of the invention an audit call may also be triggered by a key combination pressed by the user. If buttons 42 and 44 are pressed together or within 0.5 seconds then the device will commence to make an audit call. In this way call data may be collected upon request.

In the preferred embodiment of the invention it may also be desirable to provide a job identification code which is dispatched with the message from the device 1 to indicate a particular job. For example, if the device 1 is installed in a restaurant a number of different people may require taxis and therefore an indication is required to allocate a particular taxi which arrives at the restaurant with a request from a customer. In the embodiment of the invention which includes the audit function, the job identification code can be provided by the counter which initiates the audit function. In this regard, the processing means 4, upon control of the communication device 5 to dispatch a message, can also obtain an indication of the count from the counter and add one to that count and dispatch that number with the message to provide a job identification code. The processing means also causes the job identification code 72 to be displayed on the LCD display 71 or on a separate display (not shown) for that purpose so that the operator of the device can advise the customer of the job number 72. Thus, when the message is transmitted to device 15 a job number 72 is also transmitted so that the taxi driver upon arriving at the restaurant can determine the person who has requested the taxi by reference to the Job number 72.

The preferred embodiment of the invention for use in the taxi industry may also include an ancillary device 70 (see FIG. 3) which may be attached to the device 1 to provide additional information.

The ancillary device 70 may also include an input 75 for inputting additional information such as the destination of the cab, customer ID information for individual customers and the requirement for a call back from the taxi company to advise when a cab has been dispatched. The device 15 may also include provision for additional information to be stored concerning individual customers so that when a particular customer ID is received that customer's requirements can be read from memory and met by the taxi company. For example, particular customers may only wish to be served by particular taxi drivers and may have other requirements which can be met by the taxi company.

The input 75 may therefore comprise a key pad for inputting information and/or a variety of destination area buttons, for example marked, northern suburbs, western suburbs, etc, or a call back button.

The requirement for a call back to advise when a cab has been dispatched is particularly advantageous during busy periods when even though a successful call is placed at a taxi company sufficient taxis may not be available to meet total demand and therefore some customers may not be served. The requirement for a call back will simply alert the taxi company that the customer requires a telephone call to confirm when a taxi has been dispatched and this telephone call can be simply made by the taxi company to the location of the device 1 (for example a restaurant or the like) to confirm that a cab has been dispatched.

The device of FIG. 3 is a basic device 1 which generates it's own JOB number by adding together the number of successful dials for each of the input dial initiation types, not including audit or retry calls. This JOB number is transmitted along with the client PIN number to the recipient computer.

Figure 4:
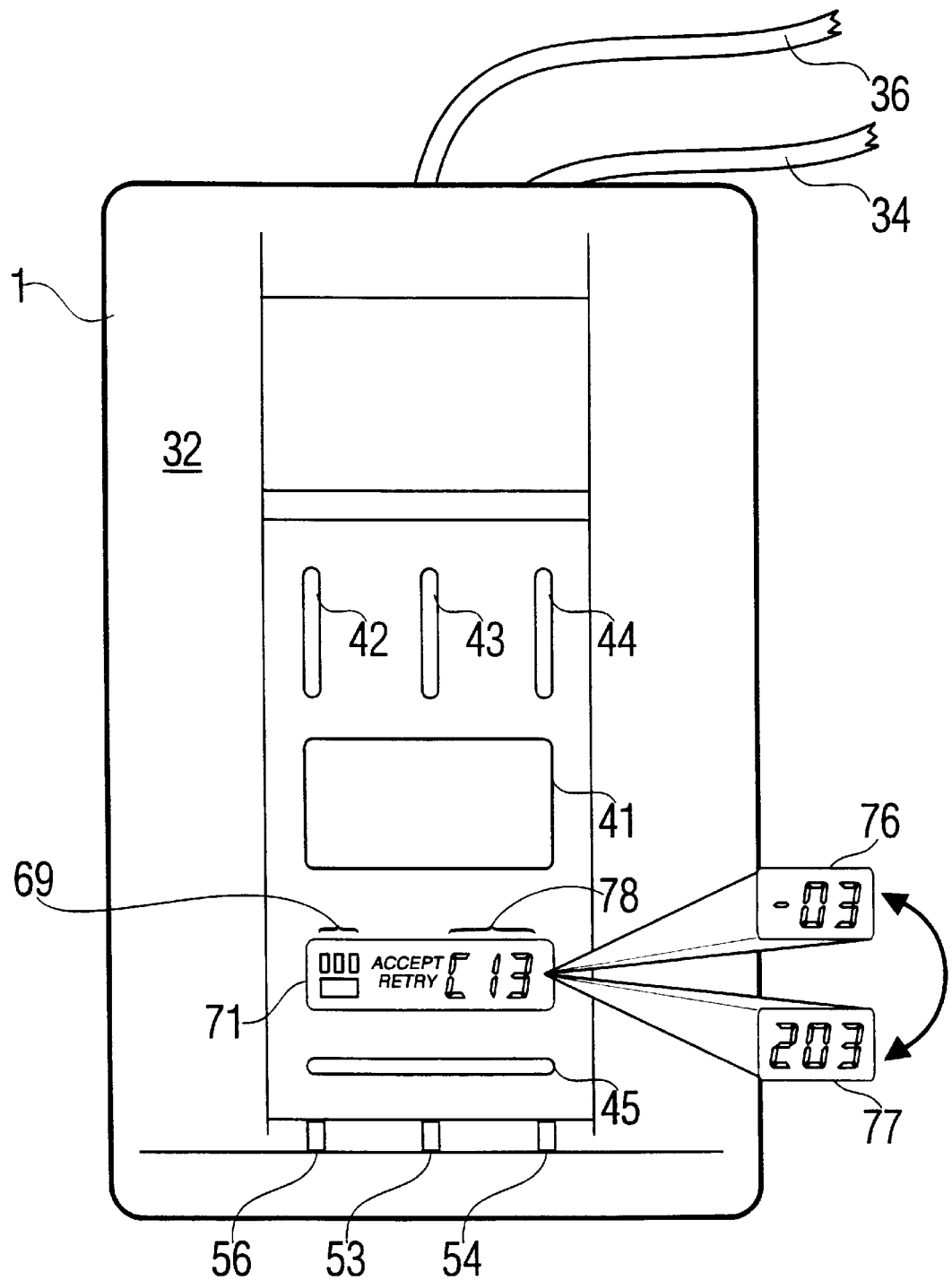
FIG. 4 illustrates a taxi ordering device according to a still further example of a preferred embodiment of the present invention.

In a further modification as shown in FIG. 4 the taxi company computer receiving the taxi order, can process information concerning the location of the taxi to take the order and to calculate an estimated time of arrival in minutes to run and to dispatch appropriate signals back to the device to provide a display or announcement of the estimated time of arrival and an identification of the taxi concerned, such as taxi number. This is shown as display 76 and 77 respectively. Display 7b is for an exception code if there is no taxi or ETA. This embodiment does not generate it's own JOB number as in the previous embodiment, rather it obtains two pieces of information from the recipient in the form of 6 DTMF digits. This data is sent after receiving and validating the PIN number transmitted to the recipient. The six digits represent JOB number and estimated time of arrival (ETA). This information is displayed in an alternating fashion with one set of three seven segment displays. If no JOB number or ETA are available from the recipient then an alternate EXCEPTION report will identify an error code to the user. If some delay is likely in the generation of the 6 digits then the ACK command may be repeated to effectively "HOLD" the device 1 on line beyond the normal 3 second limit.

The estimated time of arrival in minutes to run could also be caused to decrement by one with each minute that passes and cause a tone from the piezo tone generator when the time to ETA becomes zero. In FIG. 4 like features to that in FIG. 3 have been shown with the same numbering and, hence, their purpose and function will not be described further.

Figure 5:
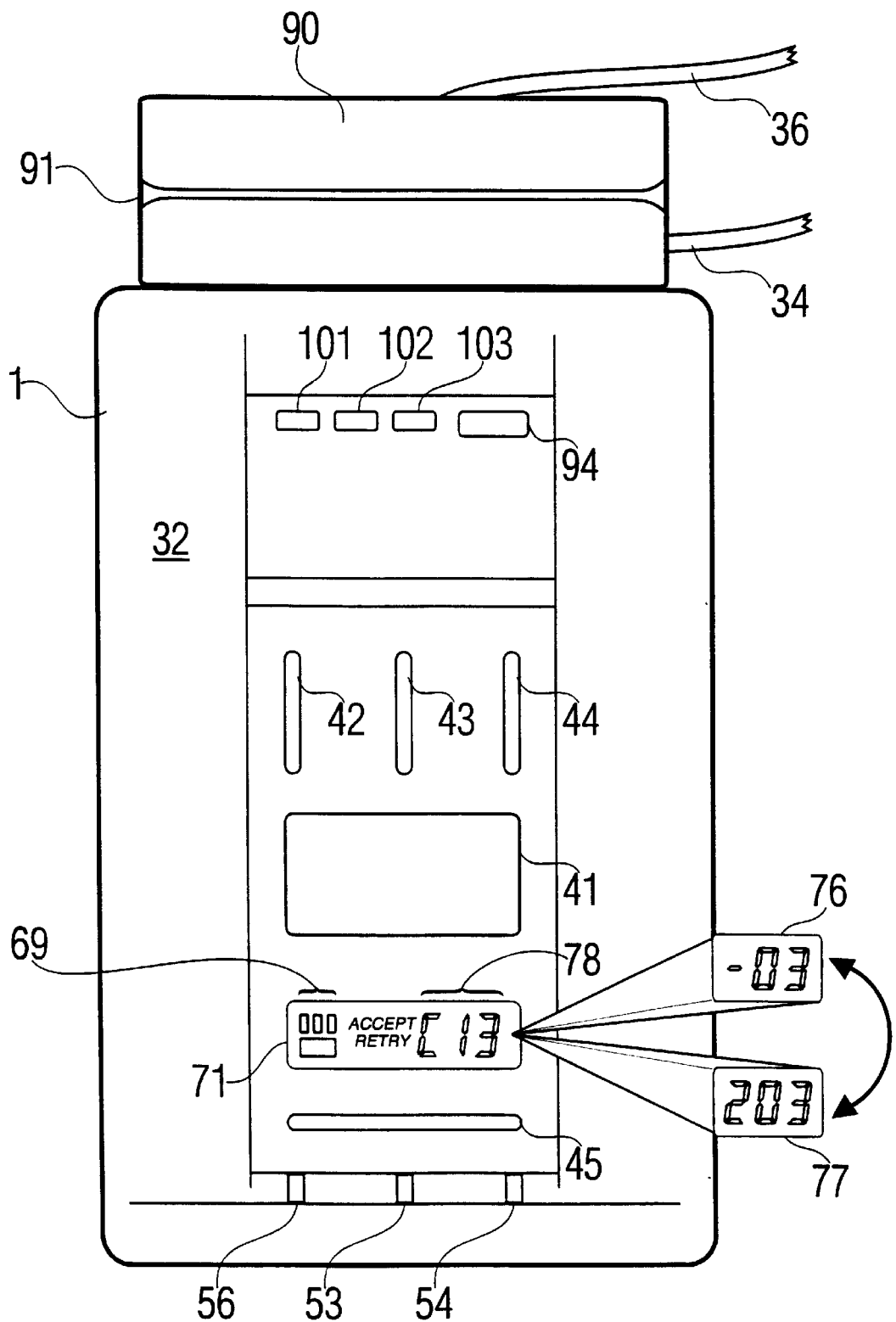
FIG. 5 illustrates a taxi ordering device according to an even further example of a preferred embodiment of the present invention.

Referring now to the example shown in FIG. 5 which is similar to the example shown in FIG. 4 with additional features, like features have been shown with the same numerical numbers as in FIGS. 3 and 4 and, hence, their purpose and function will not be described further. This embodiment is basically similar to th embodiment of FIG. 4 except it includes a CARD READER 90 and can transmit additional information from up to 3 cards with a maximum of 35 characters per card. In the data transmission it includes a 3 digit checksum. Three green LED's 101, 102 and 103 on the device 1 provide visual verification that each respective card is successfully read.

FIG. 5 clearly shows a card swiping slot 91 is formed integrally with the reader 90. The card swiping slot 91 is for receiving a card like a credit card with a magnetic strip containing the necessary character/data information for that card. A corresponding card data reading device is provided adjacent the slot 91 within the reader 90 to read data recorded on one or more cards as it/they is/are swiped through the slot 91. A clear button 94 is provided adjacent the LED's 101, 102, 103 to purge data read from the cards passed through slot 91 in the event of errors in the swiping process.

The example is particularly preferred for corporate use where many employees may be required to use a taxi facility. In this case, the employees may be provided with a personal ID card which may be swiped through slot 91. In this way, when a taxi is to be ordered, the personal ID card is swiped through slot 91, data read therefrom to identify the individual person, and the lamp means 92 will be illuminated to indicate a successful reading of data from the ID card. An appropriate one of the buttons 41, 42, 43 or 44 can then be operated to request a taxi. When the taxi company is connected via the telephone line with the device 1, the user ID information can be transferred to the taxi company to indicate who is requesting the taxi. This information can be recorded at the taxi company for subsequent auditing purposes. A computer at the taxi company can be used to check that the ID on the card passed through the slot 91 is acceptable in order to request the taxi at the particular time period when the request is made. If the request is made in a predetermined allocated time period attributable to that ID card then a taxi acknowledgment signal can be dispatched back to device 1 to indicate that a taxi has been ordered. The ID information held in device 1 as read from the ID card passed through slot 91 can then automatically be purged from a memory within the device 1 used. This memory can be used to hold the ID information pending making a call request with the taxi company. Accordingly, the electronic circuitry is provided with suitable memory for storing the ID card information for this purpose. If the swiping of the ID card through slot 91 is done in error (i.e a wrong card for example or there has been a change of mind concerning ordering a taxi), then a user would require to operate a clear button 94 to clear the memory prior to re-inserting another ID card in the card swipe slot 91.

In certain corporate applications, secretaries, for example, may be provided with a taxi service from the place of employment to their home provided they work after, say, 7.00 pm at night and prior to some later predetermined time. This information can be stored at the taxi company so that when a request is made for a taxi and the user ID card swiped through slot 91 and the corresponding user ID information transmitted to the taxi company with the request for a taxi, a check can be made to determine if the taxi request is within a predetermined time period allocated for that person. In this way, control of use of taxis by personnel can be provided.

In certain corporate applications, such as with solicitors, it may be necessary for certain staff to use taxis for delivery or collection of materials. In this case, it is necessary to eventually pass a charge on to the client of the solicitor for the taxi journey. Thus, the person requesting a taxi who has an ID card may be provided with a matter card as well. The matter card can be used at the solicitor's office to determine the client for which the journey is required. In this case, the person requesting the taxi would swipe the personal ID card through slot 91 which would, in turn, illuminate lamp 92. The matter card can then subsequently be swiped through slot 91 to illuminate lamp 93. When both lamps 92 and 93 are illuminated and the ID data and matter data are stored in memory in device 1, one of the requesting buttons 42, 43, 44 or 45 can be activated to call the taxi or to cancel a taxi order. The data information which is transmitted identifying the ID and/or the matter can be stored at a computer at the taxi company for subsequent order processing.

When the taxi order has been made and acknowledged at device 1, the memory which stores the card ID data and the matter data can be purged. This may be automatic upon receipt of an acknowledgment signal or it may be by way of activation of the push-button 94.

Figure 6A:
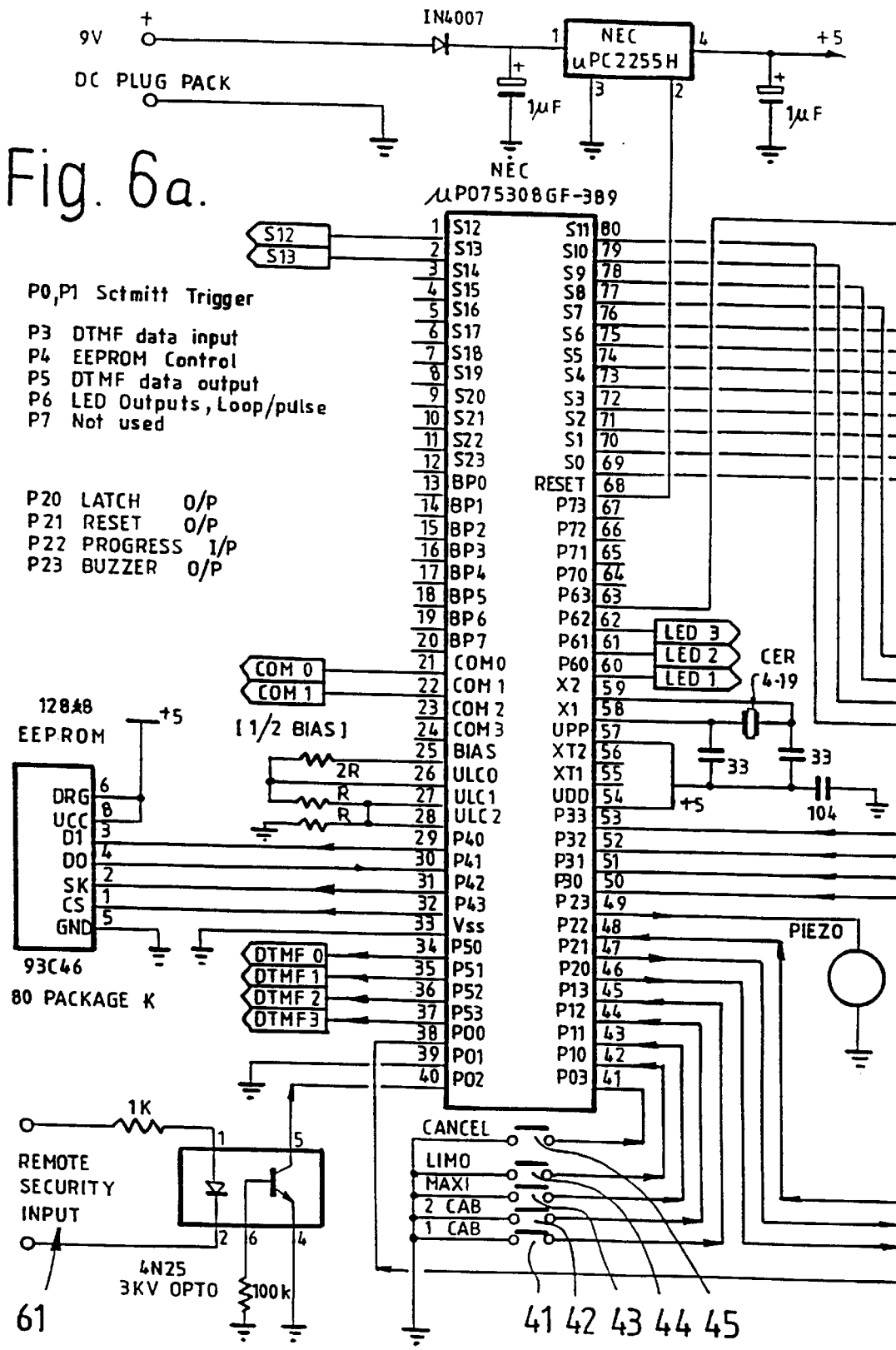
FIGS. 6a and 6b show a detailed schematic circuit diagram of one example of a preferred embodiment for calling taxis.
Figure 6B:
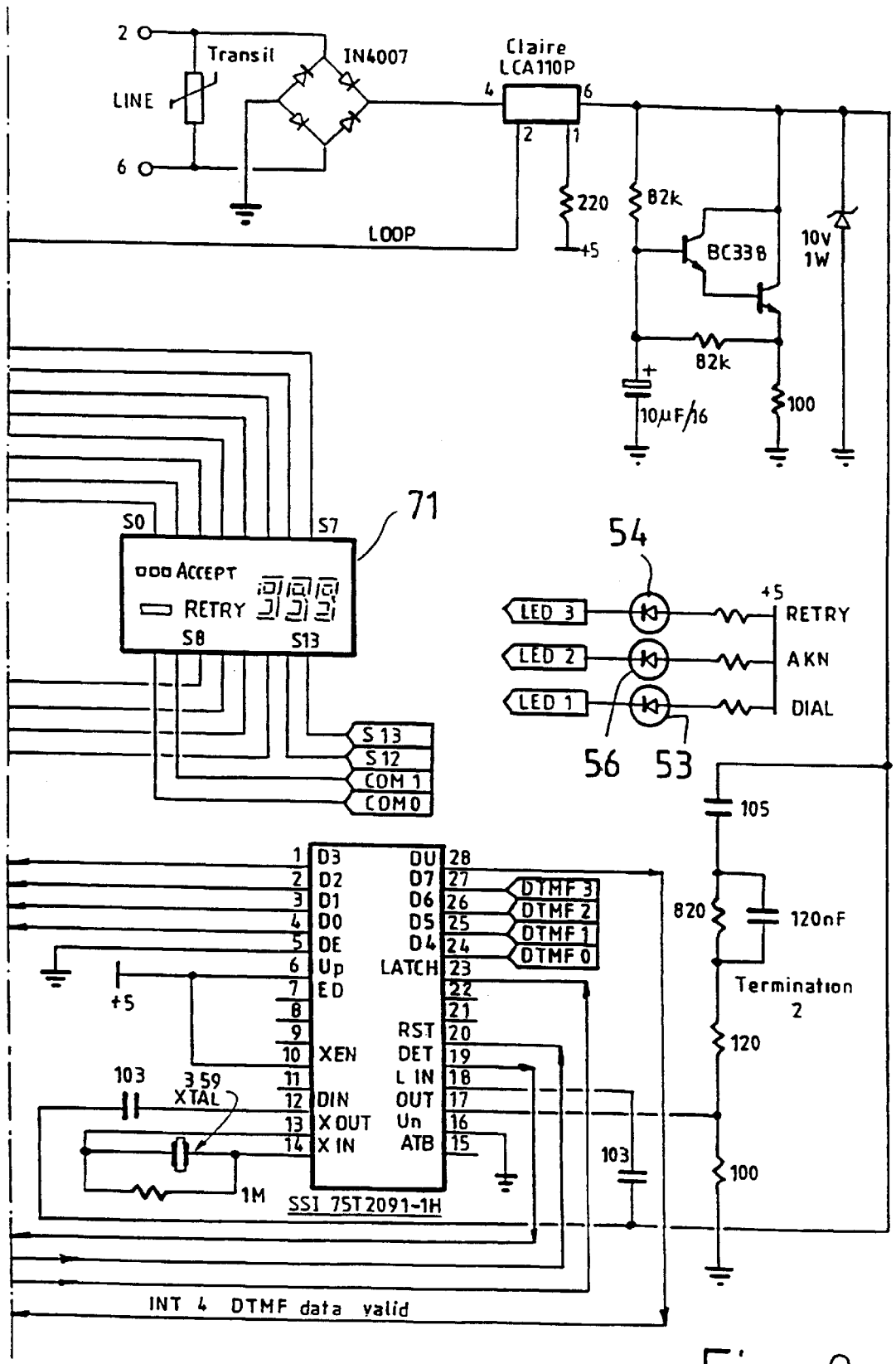

Referring now to FIG. 6 there is shown a schematic circuit diagram of the preferred device of FIG. 3 for dialling taxis. This circuit can be modified by a skilled addressee to include the features of the alternative devices of FIGS. 4 and 5.

Overview of Previous Examples

The device will contain a total of six independent dial-up phone numbers contained in "slots 1–6". Each may be up to 16 digits in length including pauses.

Each phone number corresponds to a cab call type, (1cab, 2cabs, limo, Maxicab) a security call or an audit call. An optional facility provides for the first four numbers to rotate in sequence.

Either decadic or Tone dialling is provided via an address within the EEPROM. The default being Tone.
CLIENT NUMBER (PIN)

The device will contain a single 7 digit PIN number This allows a maximum of 10 million individual diallers on any one system. After the PIN number is a zone identifier detailed as follows:
Device Calls
 1. 1 Cab Call
 2. 2 Cabs Call
 3. Limo
 4. Maxi Cab
Auxiliary Calls
 5. Security call
 6. Audit call
Cancel Call
 7. Cancel last call
Names assigned to the input types are arbitrary and may be tailored to an individual system.
AUDIT CALLS Audit calls provide a wealth of information about the device 1.

Audit calls also provide a means of re-programming or reading any type of data whatsoever from the device 1. See below under PROGRAM and READ commands.

All audit calls are directed to a particular phone number in slot 6. Of the 7 different dial initiation types described above there are internally 3 counters for each eventuality during a dial sequence. These are:
 1. Successful calls.
 2. Retries. This effectively is a count of "Failure to communicate" calls.
 3. Transparent Retries. This is generated if a device 1 is unsuccessful in transmitting it's data and performs an automatic redial up to 3 times. (Transparent to the user).

This means there are 21 different 3 digit BCD counters to represent the data. However, in any one transmission only one set of counters will be transmitted. The counter type is identified by a numeric character "X" preceding the counter string.

For convenience an identifier is included that the following is a JOB number not Counter information.
 ie. "X" numeric character
 0 JOB number
 1 Successful calls
 2 Retry (Failed calls)
 3 Transparent retry.
Note that since the device 1 will always try 3 independent dial attempts to communicate, it is expected that the TRANSPARENT retries be a minimum of 3 times the RETRY count.
Automatic Audit Generation:

Each of the counter types (1–3) are totalled and compared with a pre-set programmable value up to 999 and if the total equals or exceeds that value then an Audit Call is generated automatically, and will transmit the counter type that exceeded the set maximum. Each transmission of counters is always a set of 7 counters identifying the count for each dial initiator type.

After a successful communication all seven counters of the particular type are cleared to zero. If the communication is unsuccessful then the Audit Call will retry after every 16 successful dials until it gets through.

Forced Audit Generation:

The user may press both F1 and F3 siultaneously to force an audit call manually.

Prompted Audit Generation:

The recipient of a call may request an audit call by sending a DTMF character "C" in place of the usual ACK character "A", after validating the PIN number received from the device 1. When this option is exercised the device 1 completes the call by hanging up, and then redials immediately to the AUDIT phone number and transmits the successful calls counter set.

CALL RESPONSE PROTOCOL

After dialling the phone number the device 1 waits for a HANDSHAKE in the form of a "B" DTMF character (decimal 14). Receipt of the handshake initiates the following data string.

DATA STRING DEVICE TO RECIPIENT [ ] . . . means Audit calls only the embodiment of FIGS. 3 and 4.

N PPPPPPP Z [X *TTT . . . *TTT] # CC

Where:

N=Device type identifier
  1=embodiment of FIG. 3
  2=embodiment of FIG. 4
  3=embodiment of FIG. 5
P=7 digit PIN number
Z=Zone identifier 1–7
  1=1 Cab
  2=2 Cabs
  3=Limo
  4=Maxi
  5=Security
  6=Audit
  7=Cancel
X=Counter type
  0=Job number
  1=Call counter
  2=Retry counter
  3=Transparent retry counter These counters exist for each of the zone identifiers above.

*TTT=A three digit BCD counter

IF Z=6 Then all 7 counters are transmitted.
ELSE A 3 digit JOB number is transmitted IF Type=1 (DEVICE 1)
  ELSE No transmission of BCD counters. However if Type=3 AND card reader LED's are active transmit CARD data.
Defines the end of the string
CC Checksum of all preceding 4 bit binary DTMF digits in hexadecimal discarding overflow, MSD first. Note the embodiment of FIG. 5 has a three digit checksum. (CCC)

The device 1 will wait for 3 seconds for an ACKNOWLEDGE in the form of an "A" (decimal 13) DTMF character. If the call was an AUDIT call (Z=6) then the device 1 remains ON LINE for three seconds for possible commands.

CALL RESPONSE DESCRIPTION

If the input was from a button press then a beep will be sounded and a blinking LED 53 lamp will light to indicate a call in in progress if the input was from the auxiliary security switch 61 then the entire dial will be totally silent with no visual indications. Further presses of buttons during a dial will have no affect.

After dialling the phone number the device will wait nominally 15 seconds (programmable) for receipt of a handshake tone. If no handshake tone is received the device 1 will hang up for 2 seconds and re-loop the line for a further 2 seconds before dialling the next sequential number. During the hang up time of 2 seconds, the LED 53 will continue to flash. During the entire duration of redials the LED 53 will flash.

A total of 3 dial attempts will be made before a communication is "failed". If all three fail in communication with the recipient then a RED LED 53 will blink at a rate of once per second. A piezo buzzer will sound 3 long beeps. If the communication is successful then the GREEN LED 56 will flash once per second, and the piezo buzzer will sound 5 fast beeps.

The device 1 will redial as a result of one of the following events:

(a) Called party does not answer for n seconds;
(b) Called party answers but does not deliver correct handshake (eg. wrong number);
(c) Called party answers, delivers correct handshake but does not deliver kiss-off after receiving the device's data string or having received a corrupt data string three times in succession.

Handshake by Recipient to Device

The handshake consists of the DTMF digit "B" (14 decimal), sent by the Recipient Terminal.

Data String

After receipt of a valid ACK from the recipient, the phone will after a delay of 200 mSec send a data string comprising the following:

1 digit type identifier
7 digit client code pin number
1 digit zone identifier

On both the embodiment of FIGS. 3 and 4. If the call type identifier is an Audit Call then a further digits are transmitted as follows:

"X" identifies the following counter types.
"*" delimiter+3 digits for single cab calls
"*" delimiter+3 digits for 2 cab calls
"*" delimiter+3 digits for limo cab calls
"*" delimiter+3 digits for maxi cab calls
"*" delimiter+3 digits for security calls
"*" delimiter+3 digits for audit calls
"*" delimiter+3 digits for Cancel calls
"#" marking end of data
"nn" 2 digit checksum code. Note the embodiment of FIG. 5 sends a 3 digit checksum.

Cheaksum

The checksum is calculated internally and is the least significant 2 digits representing the 4 bit binary sum of all DTMF characters transmitted. If the chocksum is not verified by the terminal then a NAK in the form of a "D" character is sent. The device 1 will then repeat the data up to three times to try for a valid ACK, otherwise it will terminate the call and repeat the dial attempt a further 2 times. When the chocksum is verified by the terminal then an ACK is sent. The device will wait up to 3 seconds in an IDLE state waiting for any further commands.

ACK & NAK Control

ACK (acknowledge) is represented by the DTMF character "A" (decimal 13). A NAK (negative acknowledge) is represented by the DTMF character "D" (decimal 0). The DTMF character "C" may be sent in place of "A" to signal to the device 1 a prompted AUDIT request.

SEQUENCE

The following shows the protocol sequence after having dialed a number:

| | RECIPIENT TERMINAL END | | CLIENTS DEVICE |
|---|---|---|---|
| | B | Handshake request | 1–3 Type identifier pause 200 mSec + data string |
| | A | ACK or | GREEN LED 56. |
| | D | NAK.. please repeat | |
| | 3 second IDLE state commands available only from the Audit terminal. | | |
| | C | Program cycle. | |
| | | aaa    3 digit address | AACK or DNLK if address is invalid |
| | | dddd.. n digit data field | |
| | | *        delimiter | AAcK or DNAK if time-out 3 |
| sec. | | | |
| | or | | |
| | B | Read cycle. | |
| | | aaa    3 digit address | |
| | | n       number of characters to send. (1–16) | |
| | | dddd..dd #CC    1–16 digits terminated with # and a 2 digit checksum. | |
| | | # End of transmission.Device hangs up and Recipient releases line. GREEN LED flashing | |

If the device fails after three dial attempts the RED LED 54 will flash.

Any tim a NAK is sent by the device it will revert back to the IDLE state and the command character will need to be re asserted. The device will wait up to 3 seconds once entering the IDLE state. PROGRAM and READ commands may be mixed.

STATUS DISPLAY

An LCD display 71 shows the status of the last dial. It has a GRAPHIC representation of the buttons on the device to show which call type was generated. A fixed display to indicate ACCEPT or RETRY and a 3 digit variable 7 segment display to show up to a 3 digit number. In the embodiment of FIG. 3 this corresponds to the total successful calls counter. In the embodiments of FIGS. 4 and 5 the display will alternate between a 2 digit ETA prefixed with a "-" and a three digit JOB number assigned and communicated to the device 1 by the recipient. There are other displays possible. The appedix shows the display format for all situations.

PROGRAM COMMAND RECIPIENT TO DEVICE

Caaa dddd . . . dd*

Where:

C=Program command aaa=3 digit BCD address Device will send an ACK/NAK after verifying a valid address.

ddd . . . =variable length data field programed into successive locations

*=Delimiter marking the end of the field. Device will send an ACK response to receipt of *

Repeat additional address (Caaa) and data fields as required, waiting for ACK or NAK after each. Include the "C" prior to the address. IF a NAK is received after the address, the command must be repeated.

TERMINATION OF PROGRAM COMMAND #

On last data field . . . ddd# The # marks the END of programming.

READ COMMAND RECIPIENT TO DEVICE

Baaa N

Where:

B=Read comand aaa=Starting address in EEPROM

N=number of characters to send (1–16).

Repeat Baaa N as often as required Mix PROGRAM and READ commands to verify program success. Terminate with a #

DATA SENT BY DEVICE IN RESPONSE TO A READ COMMAND dddd . . . dd #CC

1–16 digits terminated with # followed by a 2 digit checksum.

CAR NUMBER, ETA, AND HOLD COMMANDS FOR EMBODIMENT OF FIG. 4

This embodiment has the following differences over the previous embodiment:

The JOB number above becomes a CAR number received by the device from the recipient.

HOLD:

The receipt of DATA by the recipient is acknowledged with an ACK and repeated within 3 second intervals to HOLD the device 1 on line until a 3 digit CAR number and 3 digit ETA number are available.

IF ETA and CAR are not available the recipient may send an exception report code. However the recipient must always send 6 digits.

Type number 2 is transmitted to identify the embodiment type of FIG. 4 device.

CANCEL CALLS:

Since the recipient generates the CAR number for each the CAR number on a CANCEL call. A CANCEL call can only be generated after a successful cab call. The recipient will know the last CAR issued to that device 1.

CAR No., ETA, & EXCEPTION REPORTS:

The display on the device 1 will normally alternate between CAR and ETA. Although ETA is displayed as a 2 digit number, it is preceded with a "-" character which is part of the recipient transmission. The prefix of "-" is imperative for the device to interpret the data as ETA. The recipient, however has control over what is displayed at the device 1, within the limits of displayable characters.

(see appendix)

When it is desired to sand an exception report the recipient must duplicate the data so that CAR and ETA are identical set of 3 digits. The device 1 detects the similarity and provides a steady state display of the three characters.

The 2 digit ETA will decrement each minute to zero with a beep on the buzzer each minute and a long beep when the display reaches zero.

DIGIT DISPLAY CHARACTERS:

Any digit from 0–9 plus the following special characters: Note that the any digit position may show a "BLANK" as will be required if an exception report is sent. ie. CAR number becomes blank!

| | | | |
|---|---|---|---|
| blank | EQU | 0AH | |
| cap_C | EQU | 0BH | |
| lwr_c | EQU | 0CH | |
| lwr_n | EQU | 0DH | ; only on digits 2&3 |
| cap_E | EQU | 0DH | ; only on digit 1 |
| dash | EQU | 0EH | |
| lwr_1 | EQU | 0FH | |

EMBODIMENT OF FIG. 5

This embodiment incorporates a CARD reader for up to 3 cards. The maximize number of characters on any card is 35. Card data is transmitted as previously defined on any call other than an Audit call, and the "X" character becomes a "4" to identify the following data an CARD data. The only other difference is that the checksum is increased to 3 digits. Note that the checksum is the 4 bit binary addition of the DTMF representation of the character and includes all characters transmitted. This means that a numeric "0" is calculated as "0AH" or 10 decimal.

CARD DATA:

The magnetic stripe card must conform to AS3522.2 and contains numeric information only on track 2. The maximum number of numeric data digits is 35. In addition to this there will be a START sentinel, and an END sentinel at the beginning and end of the data string, and a SEPARATOR sentinel which acts as a delineator for a two digit checksum integrity verifier.

The Checksum is calculated by the decimal addition of all of the numeric data not including sentinels. In this instance a numeric 0 is treated as 0.

When the data is transmitted the sentinels and card checksums are NOT transmitted.

The card must be swiped through the slot in a particular direction and orientation of the card. When the data is read a green lamp 101, 102 or 103 will light to indicate a successful swipe.

The card data storage may be cleared by pressing the "CLEAR" button 94.

Figure 7A:
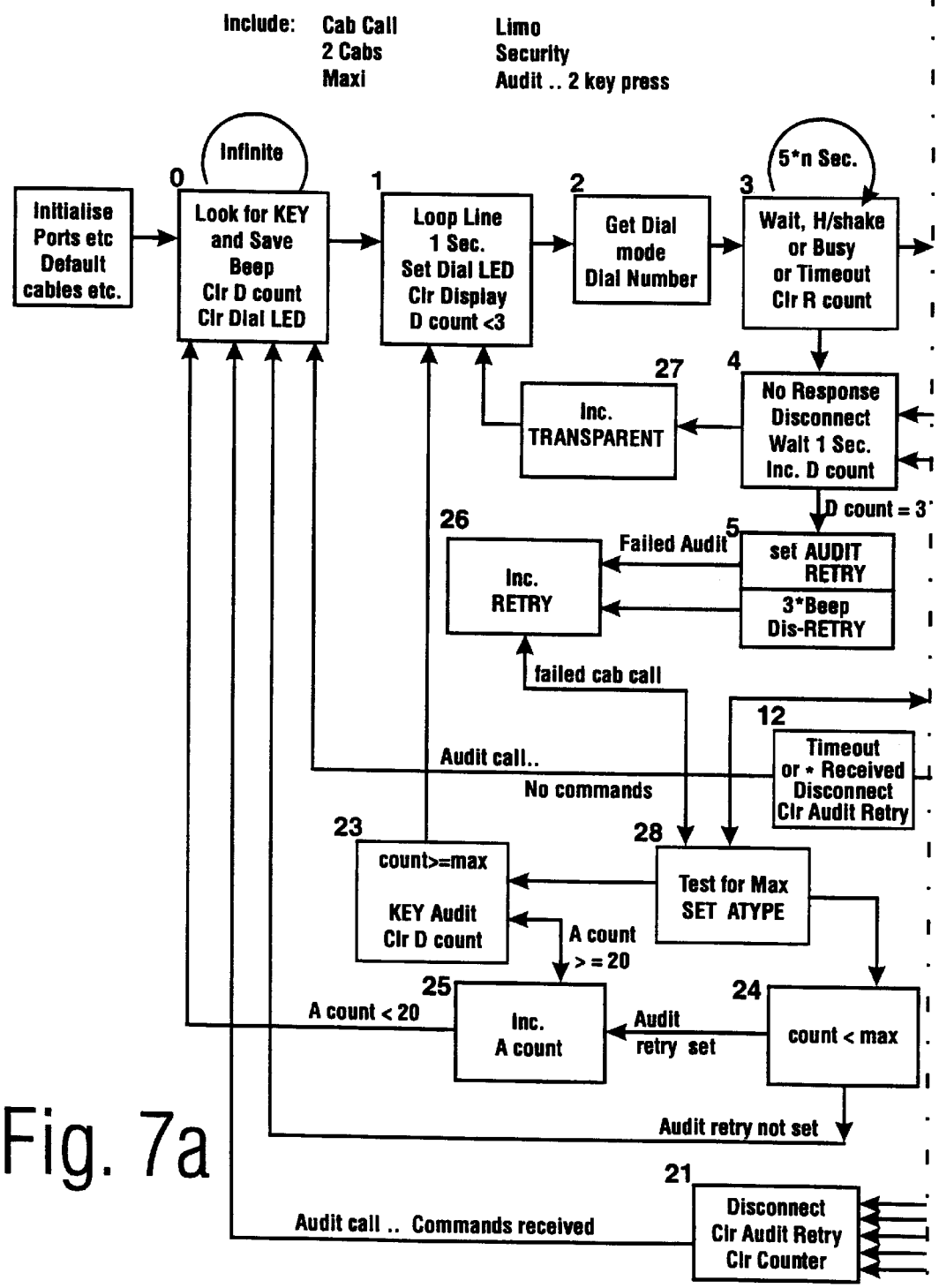
Figure 8A:
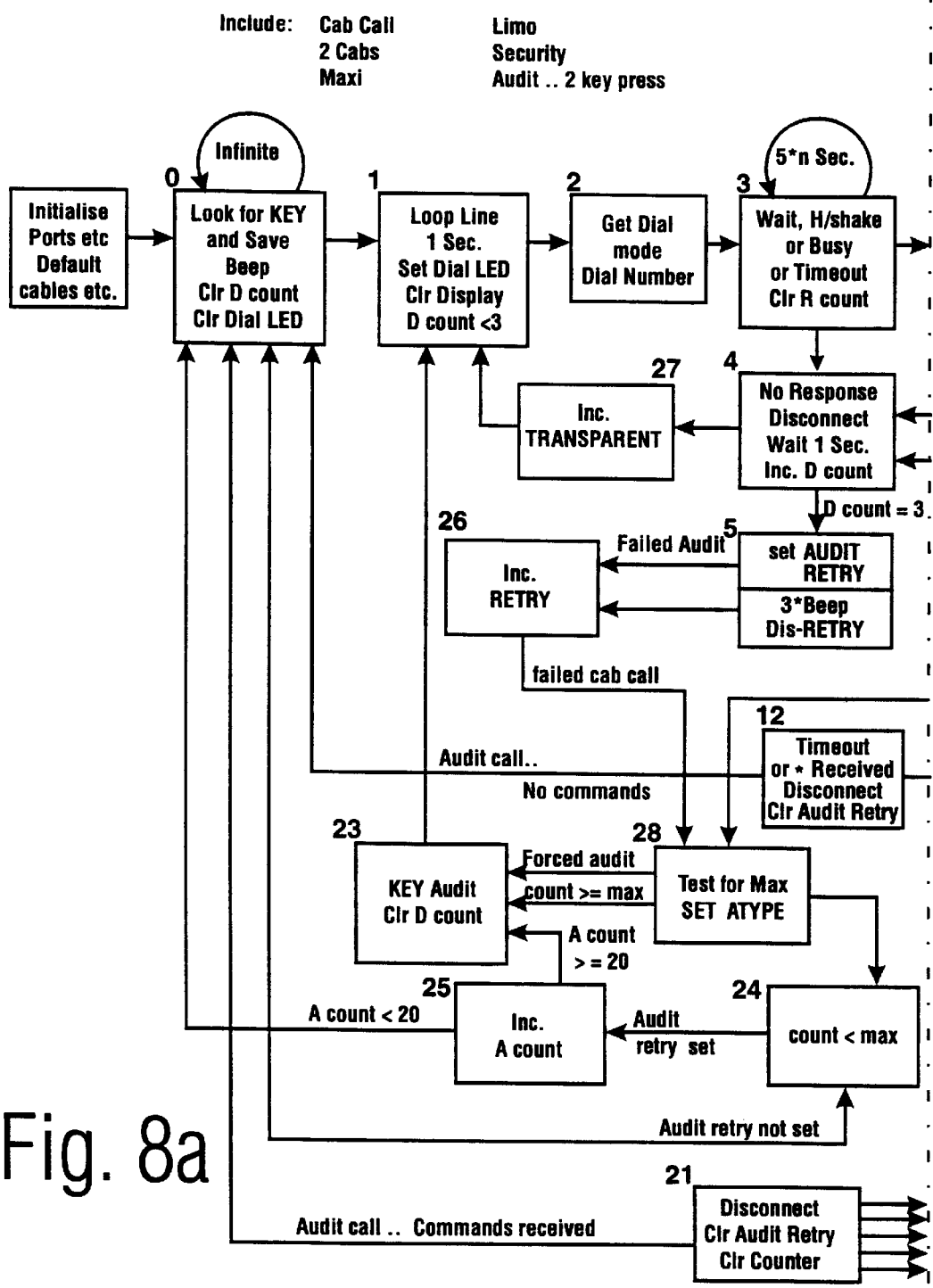
Figure 9A:
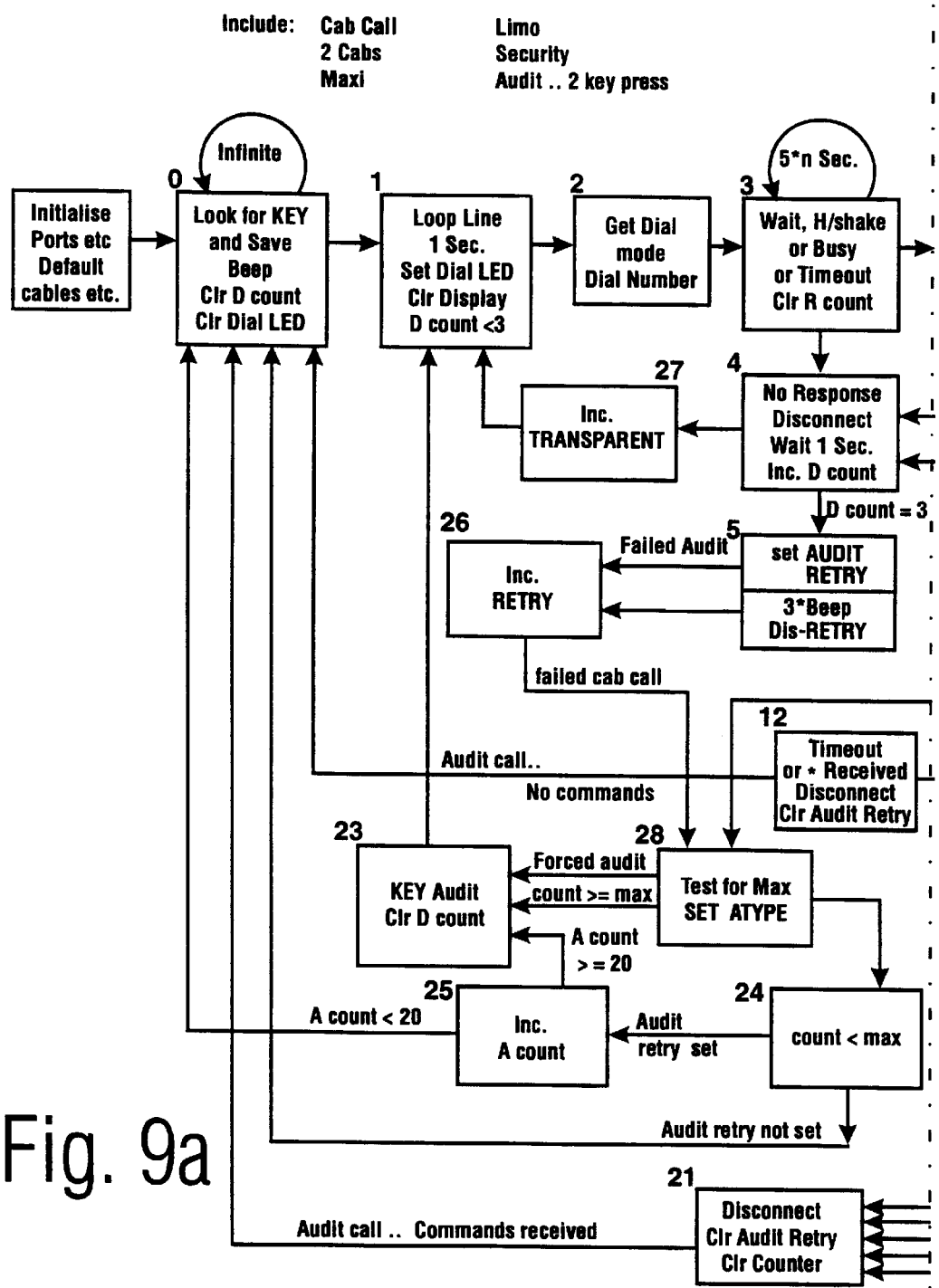
Figure 9B:
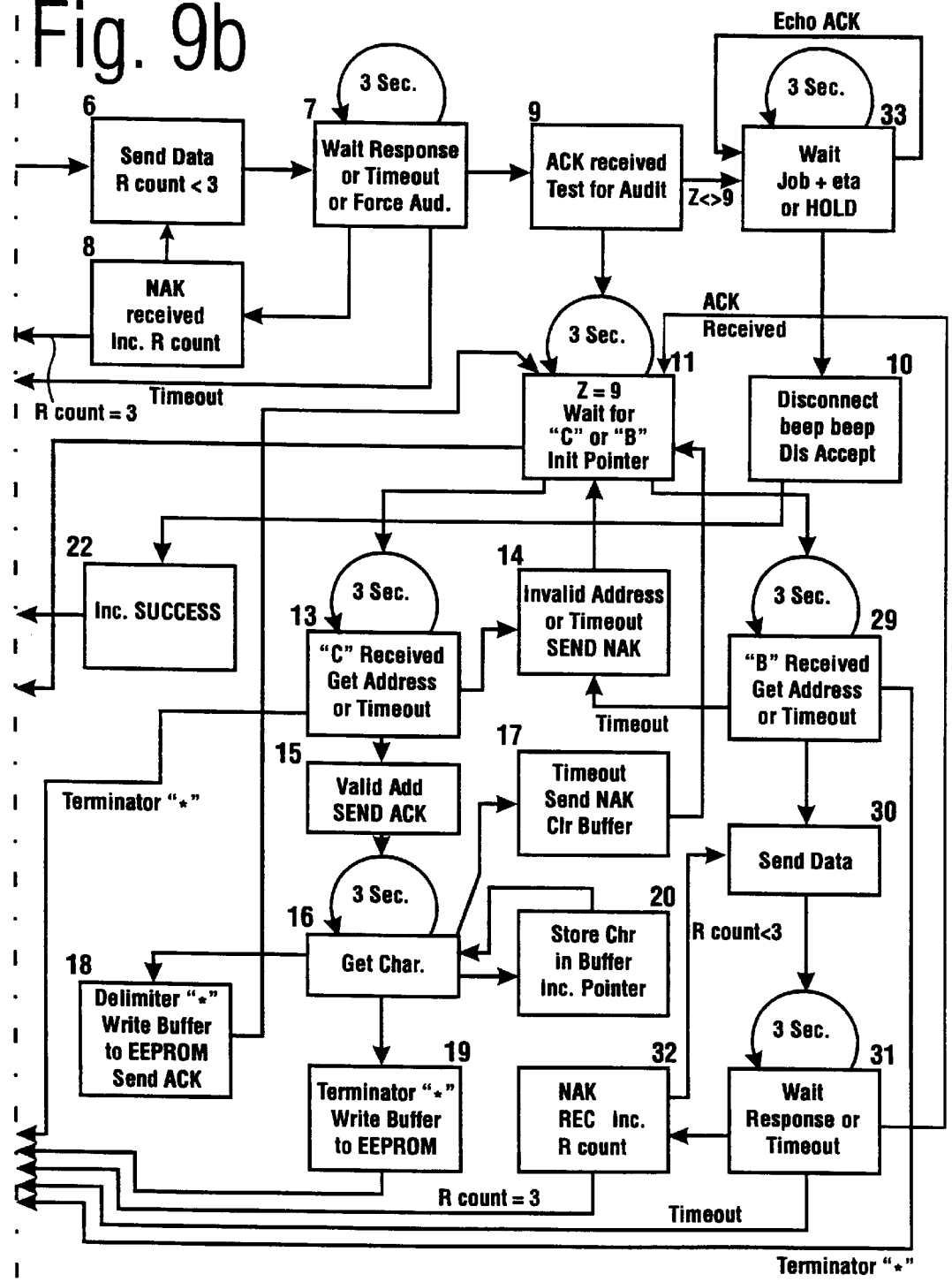

FIGS. 7*a* and 7*b* show a State Diagram of the device of FIG. 3;

FIGS. 8*a* and 8*b* show a State Diagram of the device of FIG. 4;

FIGS. 9*c* and 9*b* show a State Diagram of the device of FIG. 5.

The above description is of examples of preferred embodiments of the present invention and it is to be appreciated that the person skilled in the art could make modifications of the above preferred embodiments whilst still remaining within the scope of the present invention. Further, any combination of features disclosed may be employed in a further embodiment, and the particular combinations discloses are not to be taken as exhaustive.

APPENDIX

```
;(for DTMF transmission of 0)
;
;********************************
;
;Eeprom address equates. All Eeprom data is 8 bit.
;
PHONE_1     EQU   0
PHONE_2     EQU   8
PHONE_3     EQU   16
PHONE_4     EQU   24        ; 16 digit max, 8 bytes ea.
; Note: The first four phone numbers may optionally
; rotate.
PHONE_5     EQU   32        ; 16 digit max, 8 bytes, security
PHONE_6     EQU   40        ; 16 digit max, 8 bytes, audit
;     Fixed length codes:
PIN         EQU   48        ; 7 digit,   4 bytes
SPARE       EQU   52        ; 2 bytes,
MODE        EQU   54        ; DTMF_DEC 0=Decadic, 1=Tone
REVOLVE     EQU   55        ; Rotate first four 0=No,
                              n=Yes.. last slot 1-6
H_WAIT      EQU   56        ; Handshake wait 10's seconds
;
;These must be ORG on a 16 bit boundary for KEY offset calculation.
;
COUNT_1     EQU   40H       ; 3 digit single cab calls    BCD
COUNT_2     EQU   42H       ; 3 digit two cab calls       BCD
COUNT_3     EQU   44H       ; 3 digit limo calls          BCD
COUNT_4     EQU   46H       ; 3 digit maxi calls          BCD
COUNT_5     EQU   48H       ; 3 digit security calls      BCD
COUNT_6     EQU   4AH       ; 3 digit audit calls         BCD
COUNT_7     EQU   4CH       ; 3 digit cancel calls        BCD
RCNT_1      EQU   50H       ; 3 digit single cab calls    BCD
RCNT_2      EQU   52H       ; 3 digit two cab calls       BCD
RCNT_3      EQU   54H       ; 3 digit limo calls          BCD
RCNT_4      EQU   56H       ; 3 digit maxi calls          BCD
RCNT_5      EQU   58H       ; 3 digit security calls      BCD
RCNT_6      EQU   5AH       ; 3 digit audit calls         BCD
RCNT_7      EQU   5CH       ; 3 digit cancel calls        BCD
TCNT_1      EQU   60H       ; 3 digit single cab calls    BCD
TCNT_2      EQU   62H       ; 3 digit two cab calls       BCD
TCNT_3      EQU   64H       ; 3 digit limo calls          BCD
TCNT_4      EQU   66H       ; 3 digit maxi calls          BCD
TCNT_5      EQU   68H       ; 3 digit security calls      BCD
TCNT_6      EQU   6AH       ; 3 digit audit calls         BCD
TCNT_7      EQU   6CH       ; 3 digit cancel calls        BCD
;
```

APPENDIX-continued

```
MAX_A       EQU   70H       ; 3 digit calls before Audit   BCD
MAX_R       EQU   72H       ; 3 digit retry before Audit   BCD
MAX_T       EQU   74H       ; 3 digit transparent Audit    BCD
;
;FLEXYDIAL HEADER
;
;DTMF equates:
;
ZERO        EQU   0AH
STAR        EQU   0BH       ; DELIMITER between data
HASH        EQU   0CH       ; END of data
CHRA        EQU   0DH       ; ACK
CHRB        EQU   0EH       ; Handshake & PAUSE within Phone No.
CHRC        EQU   0FH       ; COMMAND program
CHRD        EQU   0H        ; NAK
;
ACK         EQU   0DH       ; CHR A
NAK         EQU   0H        ; CHR D
;Input equates:
;
K_cab1      EQU   1
K_cab2      EQU   2
K_limo      EQU   3
K_maxi      EQU   4         ; able to rotate
;
K_sec       EQU   5         ; dials phone_5   (Security)
K_aud       EQU   6         ; dials phone_6   (Audit)
K_can       EQU   7         ; dials S_KEY     (Cancel)
;
;
;Display Equates:
;
cab         EQU   1
cab2        EQU   2
limo        EQU   3
maxi        EQU   4
accpt       EQU   1H
rtry        EQU   2H
blank       EQU   0AH
cap_C       EQU   0BH
lwr_c       EQU   0CH
lwr_n       EQU   0DH       ; only on digits 2&3
cap_E       EQU   0DH       ; only on digit 1
dash        EQU   0EH
lwr_1       EQU   0FH
;
;Bit mapped LED's
;
LED1        EQU   0F8H
LED2        EQU   0F9H
LED3        EQU   0FAH      ; select MB1 (1F8–1FA)
;
;****** For FIG. 5 embodiment Reader Equates
;
START_WD    EQU   0BH
STOP_WD     EQU   0FH
SEP_WD      EQU   0DH
;
;Start sentinel    1011B   0BH   ; semicolon        3BH   ASCII
;End sentinel      1111B   0FH   ? question mark    3FH   ASCII
;Seperator         1101B   0DH   = equals           3DH   ASCII
;Spare             1100B   0CH   < less than        3CH   ASCII
;Spare             1110B   0EH   > greater than     3EH   ASCII
;Reserved          1010B   0AH   : colon            3AH   ASCII
```

We claim:

1. A device for dispatch of messages for requesting for-hire-transportation comprising:

memory means for storing coded information which can be used to define a message for requesting for-hire-transportation a communicating device for making a call for the dispatch of the message to an intended recipient a message confirmation means which will confirm to a person requiring to dispatch a message for requesting for-hire-transportation that the message has been received by said recipient a manually operable message dispatch initiating means by which a person requiring to dispatch the message for requesting for-hire-transportation can manually initiate procedures to dispatch that message and a processing means interconnecting the above whereby, in use, a person requiring to dispatch a message for requesting for-hire-transportation manually activates said message dispatch initiating means, and said device will automatically activate said communicating device, said communicating device will then call said recipient, relay said information from said memory means to said recipient, and then process an acknowledgment of receipt of the message to activate said message confirmation means to, in turn, provide a confirmation of acknowledgment of receipt of the message to said person and then subsequently terminate the call with said recipient, all without further intervention by said person.

2. A device as claimed in claim 1 wherein the device in configured to be for placing orders, as the message, and that the message dispatch initiating means is an order request initiating means.

3. A device as claimed in claim 2 wherein said order request initiating means is a push button.

4. A device as claimed in claim 3 wherein said device has an order request initiating means for one particular type of order, and a second or subsequent order request initiating means for a different or subsequent type of order.

5. A device as claimed in claim 4 wherein said order request initiating means includes an order request initiating means which cancels a previous order.

6. A device as claimed in claim 1 wherein said communication means is configured so it can call said recipient via a second or subsequent communication source so that if an attempt to communicate by the first source cannot be completed due to the fact that it is already engaged then it can attempt communication by the second or subsequent communication source all automatically.

7. A device as claimed in claim 1 including power supply means for supplying power to said device from a mains supply and wherein chargeable storage means is provided to store power from said mains supply and to permit power to be taken therefrom to operate said device if said mains supply is interrupted.

8. A device as claimed in claim 1 including status indicator means to cause said device to indicate the status of the last dispatch of a message.

9. A device as claimed in claim 8 wherein said status indicator means comprises a display for permanently displaying the status of the last message until next use of the device and circuit means for causing one or more lights to flash to indicate the status of the last message.

10. A device as claimed in claim 1 and audit means for causing the processing mans to output data relating to the number of successful message dispatches or unsuccessful attempts, to a recipient.

11. A device as claimed in claim 10 wherein said audit means is triggered in response to a predetermined number of successful message dispatches or unsuccessful attempts or a predetermined time period to cause data relating to the number of successful dispatches to be provided for billing purposes.

12. A device as claimed in claim 11 wherein said audit means is triggered in response to a signal received from said recipient during dispatch of messages to induce a subsequent call to be made by said device dedicated for audit purposes.

13. A device as claimed in claim 12 wherein said data is automatically provided by said device to said recipient so said recipient can process information relating to the number of successful dispatches or unsuccessful attempts.

14. A device as claimed in claim 12 wherein said audit means comprises at least one counter or clock for initiating said audit means at predetermined counts or times.

15. A device as claimed in claim 1 wherein said processing means is configured to cause a job identification code to be dispatched with the message so a particular message request by the device can be identified.

16. A device as claimed in 15 wherein said job identification code is provided by said counter so that the existing count maintained by the counter plus one is outputted with the message to provide a job identification code.

17. A device as claimed in claim 15 and including a display for displaying the identification code outputted with the message so that the user of said device obtains an indication of the job number which has been dispatched with the message.

18. A device as claimed in claim 1 and wherein said device includes additional input means for providing additional information to be communicated to said recipient for conveying destination data and/or customer data to said recipient.

19. A device as claimed in claim 18 wherein said input means comprises a card reader for reading a card containing said destination data and/or customer data.

20. A system comprising the device as defined in claim 1 and a different device for installation at the recipient of the message configured so as to detect a call and message dispatch by said device and provide an appropriate confirmation signal which can activate the message confirmation means once the message has been received.

21. A system as claimed in claim 20 wherein said different device includes a personal computer device configured so as to detect a call and message dispatch by said device and provide an appropriate confirmation signal once the message has been received.

22. A system as defined in claim 20 wherein said different device includes a data storage means for storing user data for a plurality of users so that when the information is dispatched the data storage means can be accessed to recognise the information and determine the message from the information communicated or determine the particular address from which the message is dispatched or to which the order is to be transacted to.

23. A system as claimed in claim 22 wherein a code is provided representative of the message or address of said device and wherein the code is matched with the data in the data storage means, to extract the actual message or address.

24. A system as claimed in claim 20 wherein said device includes a programming facility means for altering information in said device from a remote location.

25. A system as claimed in claim 24 wherein said reprogramming facility means is connectable with a telephone line linkage from a remote processing station to alter data in the memory or data retained in the communication means.

26. A system as claimed in claim 24 wherein said programing facility means is activated following a message dispatched by said device to said recipient whereupon said different device, upon receipt of the message, outputs a signal indicating reprogramming is to take place and outputs new data to alter the data in said memory or said communication means.

27. A method of dispatch of a message for requesting for-hire-transportation comprising the steps of
 (a) storing information which can be used to define the message for requesting for-hire-transportation,
 (b) activating a message dispatch request initiating means to, in turn, subsequently automatically activate a communication device to communicate with an intended recipient providing for-hire-transportation, communicating said information, subsequently receiving an acknowledgment of receipt of the message and activating a message confirmation means to provide confirmation of acknowledgment of receipt of the message, and then subsequently terminating the communication with said recipient.

* * * * *